(12) United States Patent
Schmidt et al.

(10) Patent No.: US 11,554,636 B2
(45) Date of Patent: Jan. 17, 2023

(54) ENCLOSURE FOR A VEHICLE SYSTEM

(71) Applicant: Transportation IP Holdings, LLC, Norwalk, CT (US)

(72) Inventors: Timothy R. Schmidt, Arlington Heights, IL (US); Matthew Chapman, Seattle, WA (US); Karl J. Kobel, Wildwood, IL (US); Richard Peck, Richmond, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 559 days.

(21) Appl. No.: 16/740,797

(22) Filed: Jan. 13, 2020

(65) Prior Publication Data

US 2020/0148165 A1 May 14, 2020

Related U.S. Application Data

(63) Continuation-in-part of application No. 15/592,797, filed on May 11, 2017, now Pat. No. 10,596,989.

(60) Provisional application No. 62/335,235, filed on May 12, 2016, provisional application No. 62/335,281, filed on May 12, 2016.

(51) Int. Cl.
| | |
|---|---|
| *B60H 1/24* | (2006.01) |
| *B60R 25/01* | (2013.01) |
| *B60J 10/80* | (2016.01) |
| *E06B 7/02* | (2006.01) |
| *B60R 11/00* | (2006.01) |

(52) U.S. Cl.
CPC .............. *B60H 1/243* (2013.01); *B60J 10/80* (2016.02); *B60R 25/01* (2013.01); *E06B 7/02* (2013.01); *B60R 2011/0021* (2013.01)

(58) Field of Classification Search
CPC . B60H 1/24; B60H 1/243; B60H 1/248; B60J 5/04; B60J 5/0412; B60J 5/0497; E06B 7/02
USPC ................................ 296/146.1, 152; 454/95
See application file for complete search history.

(56) References Cited

U.S. PATENT DOCUMENTS

| | | | | |
|---|---|---|---|---|
| 2,655,092 | A | * | 10/1953 | Spooner ............. B60H 1/00464 454/109 |
| 6,030,285 | A | * | 2/2000 | Chen ...................... B60H 1/248 454/162 |
| 2003/0222175 | A1 | * | 12/2003 | Movsesian ............ B64C 1/1469 244/118.5 |
| 2014/0250654 | A1 | * | 9/2014 | Forest ................ B60H 1/00378 29/402.08 |

FOREIGN PATENT DOCUMENTS

| | | | | |
|---|---|---|---|---|
| CN | 107120042 A | * | 9/2017 | |
| CN | 114162033 A | * | 3/2022 | |
| DE | 19533596 A1 | * | 3/1997 | ............. B60H 1/267 |
| KR | 19980035601 U | * | 9/1998 | |

* cited by examiner

*Primary Examiner* — Jason S Daniels
(74) *Attorney, Agent, or Firm* — The Small Patent Law Group LLC; Will Breeze

(57) ABSTRACT

A barrier door for a protective enclosure includes a lower section and an upper section operably coupled with the lower section, and a ventilation system disposed within the lower section. The ventilation system includes one or more blowers and a plenum. The ventilation system is configured to direct air one or more of into or out of the protective enclosure.

20 Claims, 32 Drawing Sheets

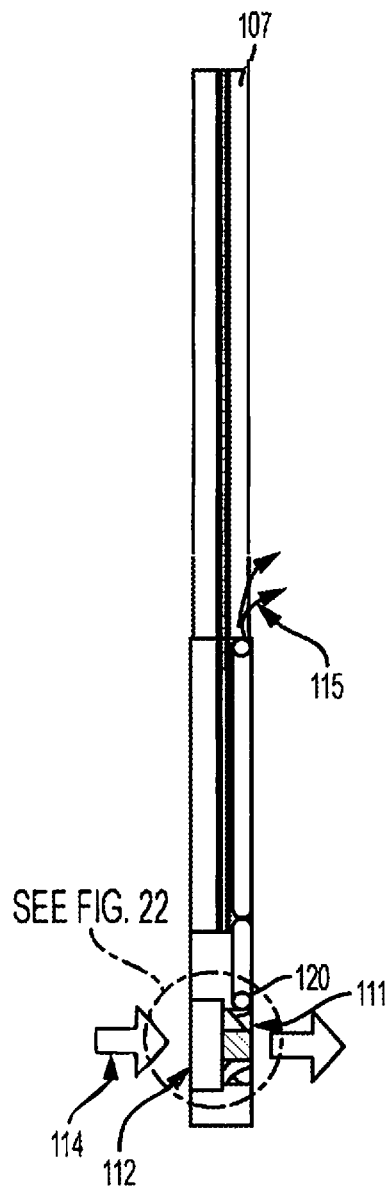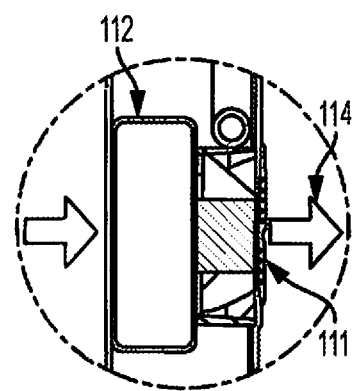
FIG. 21
FIG. 22

ENCLOSURE FOR A VEHICLE SYSTEM

CROSS REFERENCE TO RELATED APPLICATIONS

This application is a continuation-in-part of U.S. patent application Ser. No. 15/592,797, filed on May 11, 2017, which claims priority to U.S. Provisional Patent Application No. 62/335,235, filed on May 12, 2016, and U.S. Provisional Patent Application No. 62/335,281, filed on May 12, 2016, the entire disclosures of which are incorporated herein by reference.

BACKGROUND OF THE INVENTION

Technical Field

The present invention relates to enclosures for vehicle systems.

DISCUSSION OF ART

For many years, it has been desirable to provide vehicle system operators, such as bus drivers, with an enclosure so as to substantially isolate the driver from occupants within the vehicle. Not only does such an enclosure help prevent assaults on the driver, but it also limits distractions from other occupants that may divert the attention away from safe operation of the vehicle. Thus, the enclosure not only protects the driver, but also aids in protecting passengers and other users of the roadway by helping to limit unnecessary distractions.

Known enclosures generally include a fixed rear barrier, located behind the driver, along with a barrier door that enables the driver to enter and exit the operator's station. These barrier doors often include a solid bottom portion made of either a transparent or non-transparent material, along with a clear window portion above the solid bottom portion to allow the driver to sufficiently view side mirrors, entrance areas to the vehicle, etc. In some instances, these window portions are not movable with respect to the barrier door. On the other hand, other barrier doors may incorporate clear window portions that may be opened (or partially opened) by the driver. As one example, a protective barrier for a driver may incorporate a movable window having multiple telescopic panes extending substantially across the width of the vehicle at a location behind the driver.

While barrier doors incorporating movable windows are known, such doors generally require manual opening and closing by the driver. Such a configuration is not only inconvenient for the driver, but it may also lead to distractions while operating the vehicle, as well as ergonomic concerns. Furthermore, a manually-operable window may be more susceptible to manipulation by a passenger, thereby reducing the protective effect of the barrier door itself. Other known barrier doors may incorporate a pneumatic assist for a manual opening and closing of the doors, but such pneumatic systems increase the complexity of the overall enclosure system.

Further, it may be undesirable for the operator to leave the window(s) open, as doing so may negate the protective nature of the barrier door. However, leaving the window(s) closed may reduce an amount of ventilation and air flow through the operator's station, as the existing heating and air conditioning vents in and around the operator's station may have been originally designed to work in a space that did not incorporate a retrofitted barrier door. The heating and air conditioning vents in and around the operator's station may not be individually controllable so as to allow the operator to provide additional localization as needed. Such a configuration is not only uncomfortable for the operator, but it may also lead to fogging of the window(s) of the barrier door under certain conditions, thereby decreasing the operator's visibility. Furthermore, the large windshield in front of the operator's station can create a large heat load, which may discourage the operator from using the barrier door at all.

BRIEF DESCRIPTION

The present disclosure provides a barrier door for a protective enclosure that may incorporate a window panel therein, wherein the barrier door provides both protection and reduced distraction for the driver. The present disclosure also provides a barrier door for a protective enclosure which incorporates a powered ventilation system therein, wherein the barrier door provides both protection and increased comfort for the driver, passenger, or the like. The powered ventilation system may incorporate one or more blower fans to allow the driver to control the level of ventilation. Additionally, the powered ventilation system may include a heating and/or cooling element to provide an additional level of comfort control. It is also desirable to be able to open a portion of the barrier temporarily for customer interaction, to improve airflow, or for driver while being able to rapidly close the barrier.

In accordance with some aspects of the disclosure, a barrier door for use in a protective enclosure may have a lower section formed of at least one of a transparent, semi-transparent, or non-transparent material, an upper section formed of at least one substantially transparent material, and a transparent window movable between the lower section and the upper section. The transparent window is coupled to an electromechanical lift device housed in the lower section, and the transparent window, when moved into the lower section, only opens a portion of the upper section.

In accordance with other aspects of the disclosure, the upper section may further comprise an anti-rattle pocket configured to accept a portion of the transparent window when the transparent window is moved into the upper section. Furthermore, the electromechanical lift device may be a driven cable-type window regulator. The lower section may comprise at least one channel to support the transparent window. The upper section may comprise a non-movable transparent section, with the non-movable transparent section extending wider than the lower section.

In accordance with some other aspects of the disclosure, a barrier door for use in a protective enclosure surrounding a vehicle operator is shown and described, the barrier door comprising a lower section, an upper section formed of at least one substantially transparent material, and at least one electric blower located in a plenum of the lower section, the at least one electric blower configured to blow air into or out of the protective enclosure to provide improved ventilation and air flow to a vehicle operator.

In accordance with other aspects of the disclosure, the barrier door may comprise two electric blowers, wherein the electric blowers may blow air in either the same direction or in different directions, respectively. Additionally, the electric blower may incorporate at least one of a heating and cooling element.

According to one example of the present disclosure, a barrier door for a protective enclosure is provided. The barrier door comprises a lower section and an upper section, the upper section comprising an outer stationary portion and an inner movable portion disposed within the outer stationary portion. The outer stationary portion and the inner movable portion are light transmissive. The inner movable portion is movable in a vertical direction and is coupled to a lift device disposed in the lower section. The lift device is configured to move the inner movable portion between a lowered position in which the inner movable portion is at least partially withdrawn into the lower section to form an opening in the upper section and a raised position in which the inner movable portion is extended to close the opening.

According to another example of the present disclosure, a barrier door for a protective enclosure is provided. The barrier door comprises a lower section; an upper section, the upper section being light transmissive; and a ventilation system disposed within the lower section, the ventilation system comprising at least one blower and a plenum. The ventilation system is configured to direct air to or from the protective enclosure.

According to another example of the present disclosure, a protective enclosure for a transit vehicle is provided. The protective enclosure comprises a rear screen disposed behind a position in the protective enclosure; a barrier door, the barrier door comprising a lower section and an upper section, the upper section comprising an outer stationary portion and an inner movable portion disposed within the outer stationary portion; and a hinge structure connecting the barrier door to the rear screen. The outer stationary portion and the inner movable portion are light transmissive. The inner movable portion is movable in a vertical direction and is coupled to a lift device disposed in the lower section. The lift device is configured to move the inner movable portion between a lowered position in which the inner movable portion is at least partially withdrawn into the lower section to form an opening in the upper section and a raised position in which the inner movable portion is extended to close the opening.

BRIEF DESCRIPTION OF THE DRAWINGS

The inventive subject matter may be understood from reading the following description of non-limiting embodiments, with reference to the attached drawings, wherein below:

FIG. 21 is a cross-sectional view of the barrier door of FIG. 20;

FIG. 22 is an enlarged view of area XXII shown in FIG. 21;

DETAILED DESCRIPTION

Figure 1:
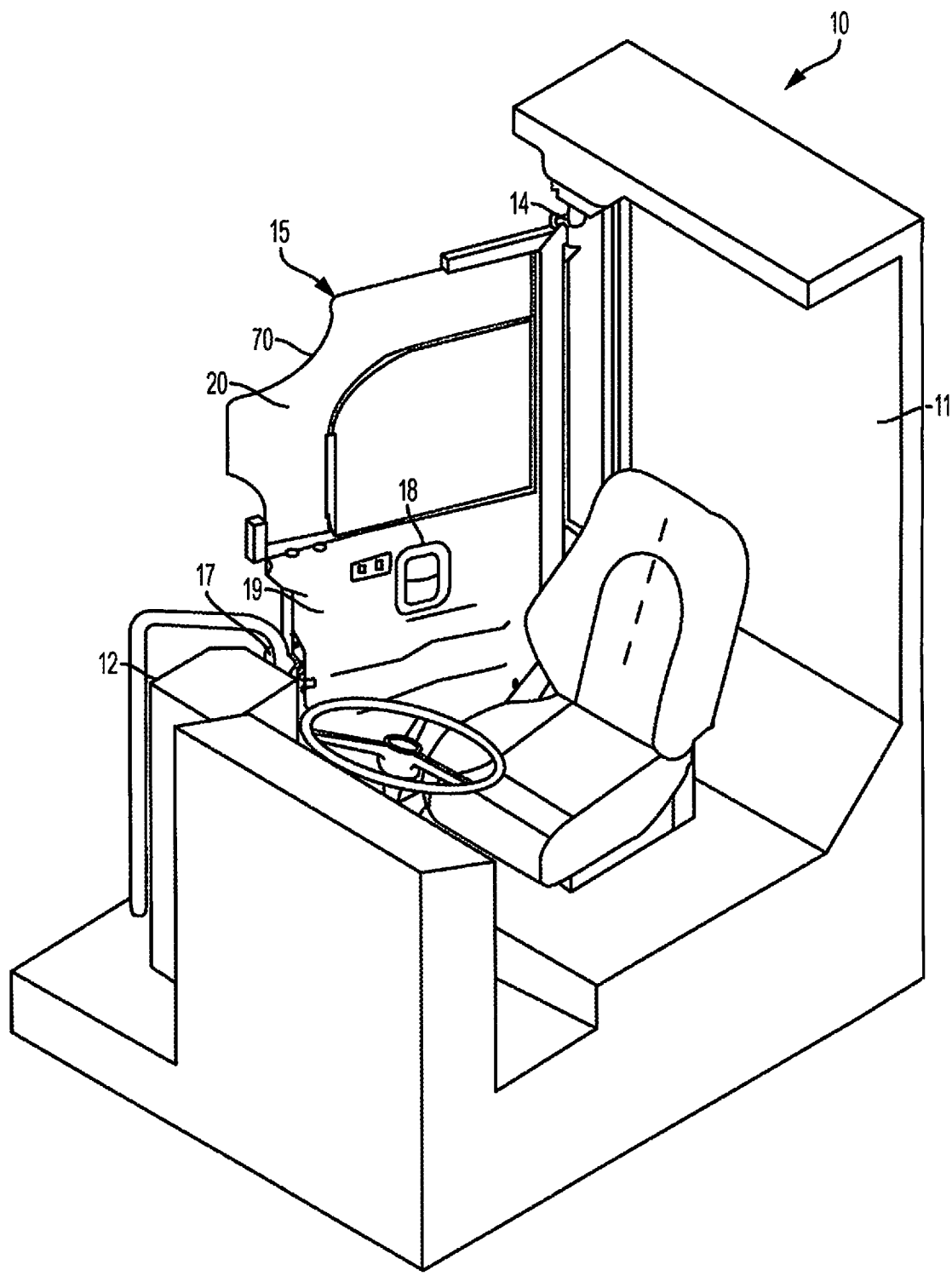
FIG. 1 is an interior perspective view of a protective enclosure having a barrier door according to an example of the present disclosure.

For purposes of the description hereinafter, the terms "end", "upper", "lower", "right", "left", "vertical", "horizontal", "top", "bottom", "lateral", "longitudinal", "forward", "rearward", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

With reference to FIGS. 1-17, a protective enclosure 10 for a vehicle system, such as a bus, subway car, trolley car, aircraft (manned or unmanned, such as drones), rail vehicle, mining vehicle, marine vessel, agricultural vehicle, other off-highway vehicles, or the like, is shown according to an example of the present disclosure. According to the depicted example, the transit vehicle is a bus. The protective enclosure 10 incorporates an operator station for the vehicle, including the seat, a wheel, and other vehicle controls. While some embodiments described herein relate to the protective enclosure of a driver seat of a vehicle system, in particular a bus, not all embodiments are restricted to driver or operator stations, or buses. For example, one or more embodiments may relate to passenger stations or seats, co-pilot or co-navigator positions, or the like, as they pertain to any alternative vehicle system.

The protective enclosure 10 includes a rear screen 11 disposed behind the position in the protective enclosure 10 and a barrier door 15 that moves between open and closed positions to allow and limit access to the protective enclosure 10. A hinge structure 14 pivotably connects the barrier door 15 to the rear screen 11.

Figure 2:
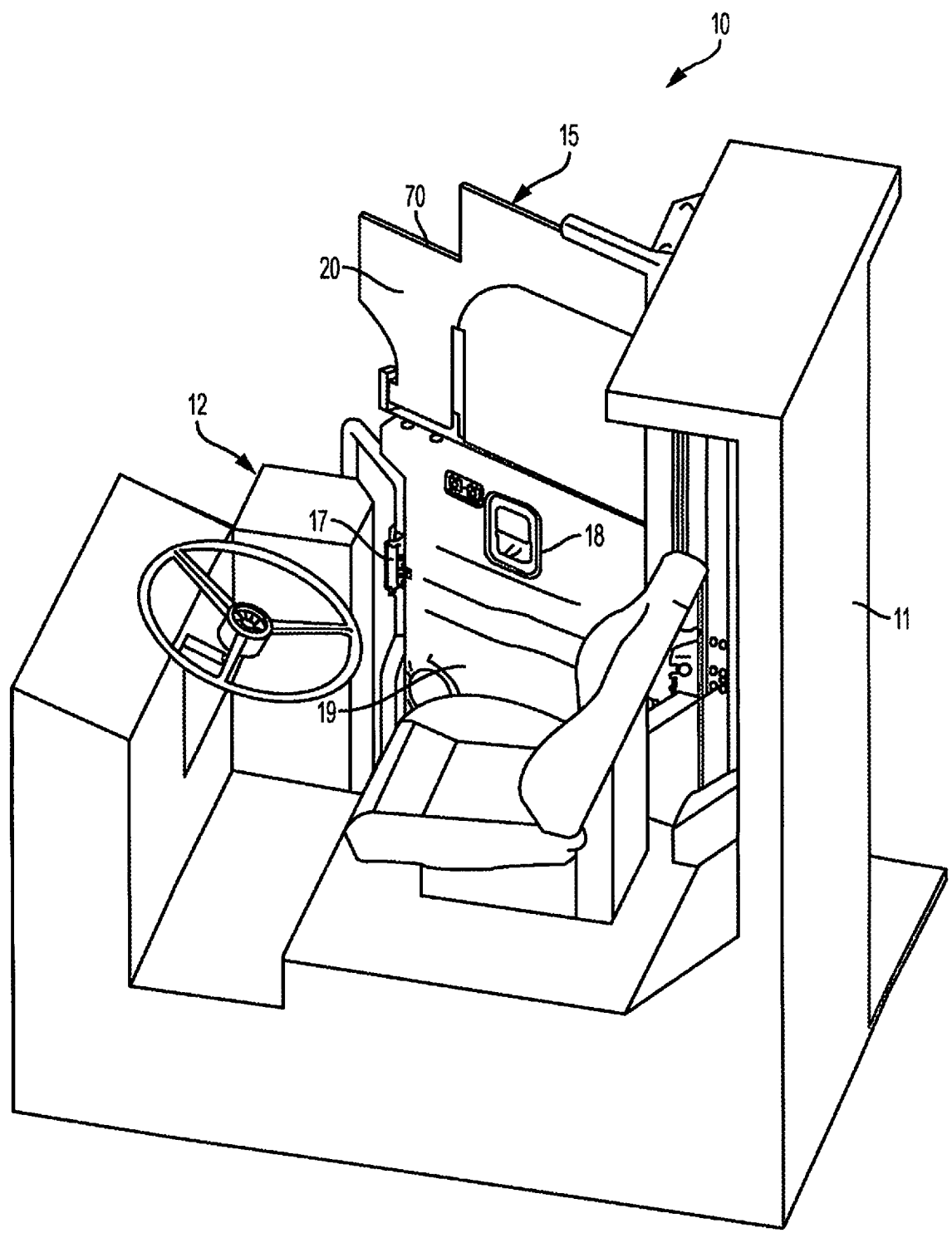
FIG. 2 is another interior perspective view of the protective enclosure of FIG. 1.
Figure 3:
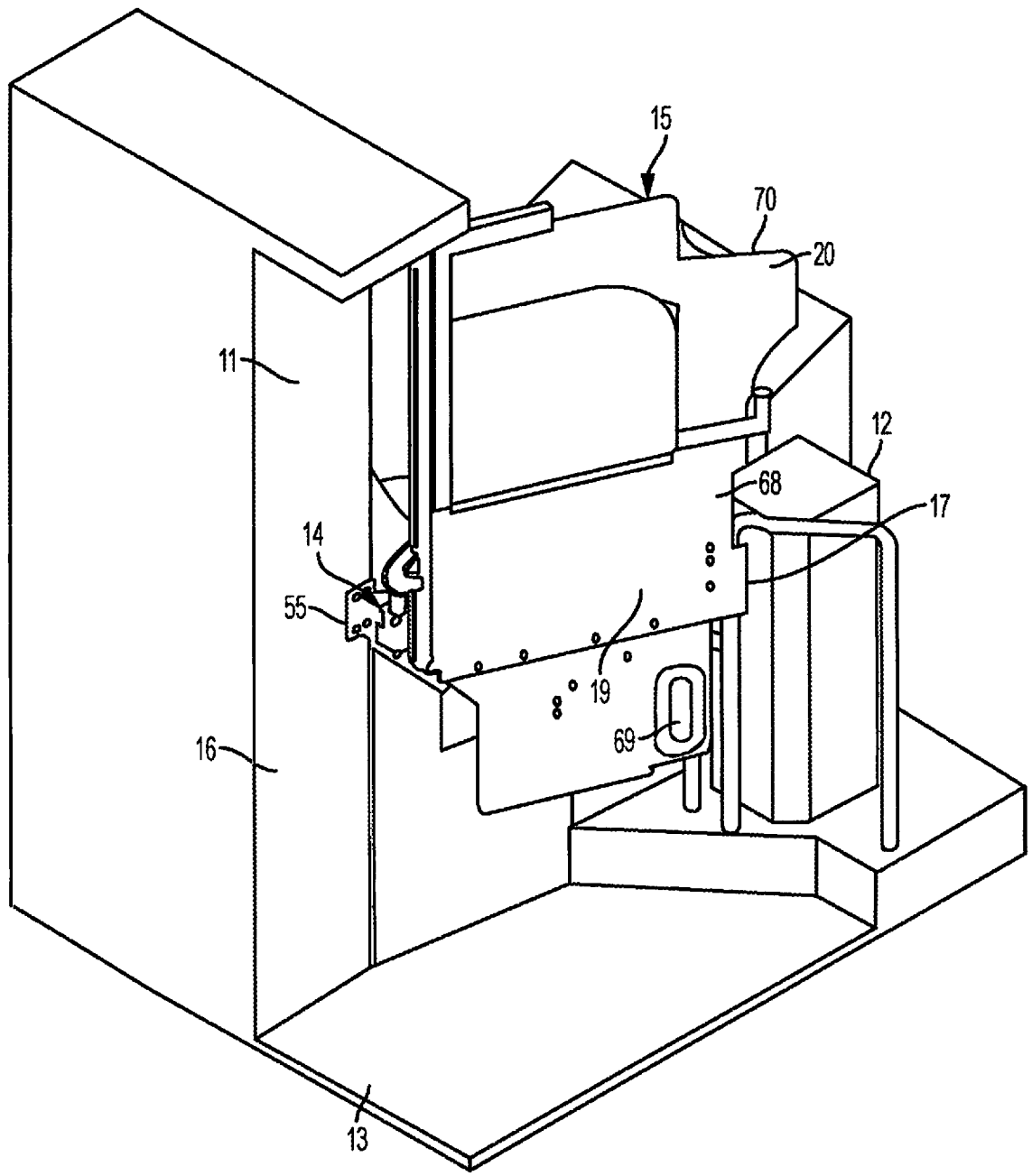
FIG. 3 is an exterior perspective view of the protective enclosure of FIG. 1.

As shown in FIGS. 1-3, the protective enclosure 10 is located at the left front of the bus. The rear screen 11 may be pre-installed on the bus without the barrier door 15. If installed, a fare box 12 is generally located to the right and forward of the position when the bus is configured for driving on the right side of a roadway. To provide clearance for wheelchair access on the bus, the barrier door 15 may be provided with sufficient clearance from a right wheel well and above a floor level 13 of the vehicle according to government guidelines. It is appreciated that the barrier door 15 may extend to the floor level 13 or just above the floor level 13. The barrier door 15 is positioned with respect to the operator's station to provide adequate space for the driver to comfortably sit and access all controls.

The hinge structure 14 connects the rearward side of the barrier door 15 to the edge of the rear screen 11. The hinge structure 14 and the barrier door 15 may be configured to allow for the barrier door 15 to pivot through the aisle and stow against a structure 16 of the rear screen 11 directly behind barrier door 15. Alternatively, the hinge structure 14 and the barrier door 15 may be structured to prevent the barrier door 15 from fully opening.

The barrier door 15 includes a latch 17 on the forward side thereof to secure the barrier door 15 in a closed position. A latch release control 18 is provided on the barrier door for actuating the latch 17. The latch release control 18 may be positioned in such a way to make the latch accessible from outside the protective enclosure 10 in case of an emergency, but be sufficiently obscured from the exterior of the protective enclosure 10 to deter an attacker from attempting to open the barrier door 15. Optionally, the barrier door may be held or maintained in a closed position and/or an open position by any alternative latching, clasping, or locking mechanism.

As shown in FIGS. 1-6, according to one example of the present disclosure, the latch release control 18 includes a two-action door latch mechanism. Such a mechanism may be constructed using a variety of commercially available latch handles or with an integral mechanism. The latch release control includes an actuation lever 66 that, when pulled, unlatches the barrier door. An additional control 67, such as a knob, activates a second mechanism that will disable the latch release control by removing the mechanical link to the latch or by preventing the motion of the actuation lever 66. The actuation lever and the additional control knob 67 are accessible from outside the protective enclosure 10 but not easily accessible or obvious from outside the protective enclosure. The two-action mechanism is configured to allow a person to gain access to the protective enclosure from outside while adding additional steps to the process of opening the barrier door from the closed position to slow down and impede an attacker. The driver must actively engage the latch release control to require actuation of the two-action mechanism to open the barrier door. If the driver does not actively engage the latch release control to require the two-action actuation, the latch release control remains a single action control actuated via the actuation lever. According to an alternative example, the additional control knob of the latch release control is engaged by default and the latch release control is always a dual action control. According to this example, the driver does not need to anticipate an attack and actively operate the latch release control to require dual actuation, but the latch release control may be less convenient to actuate to open the barrier door.

Figure 4:
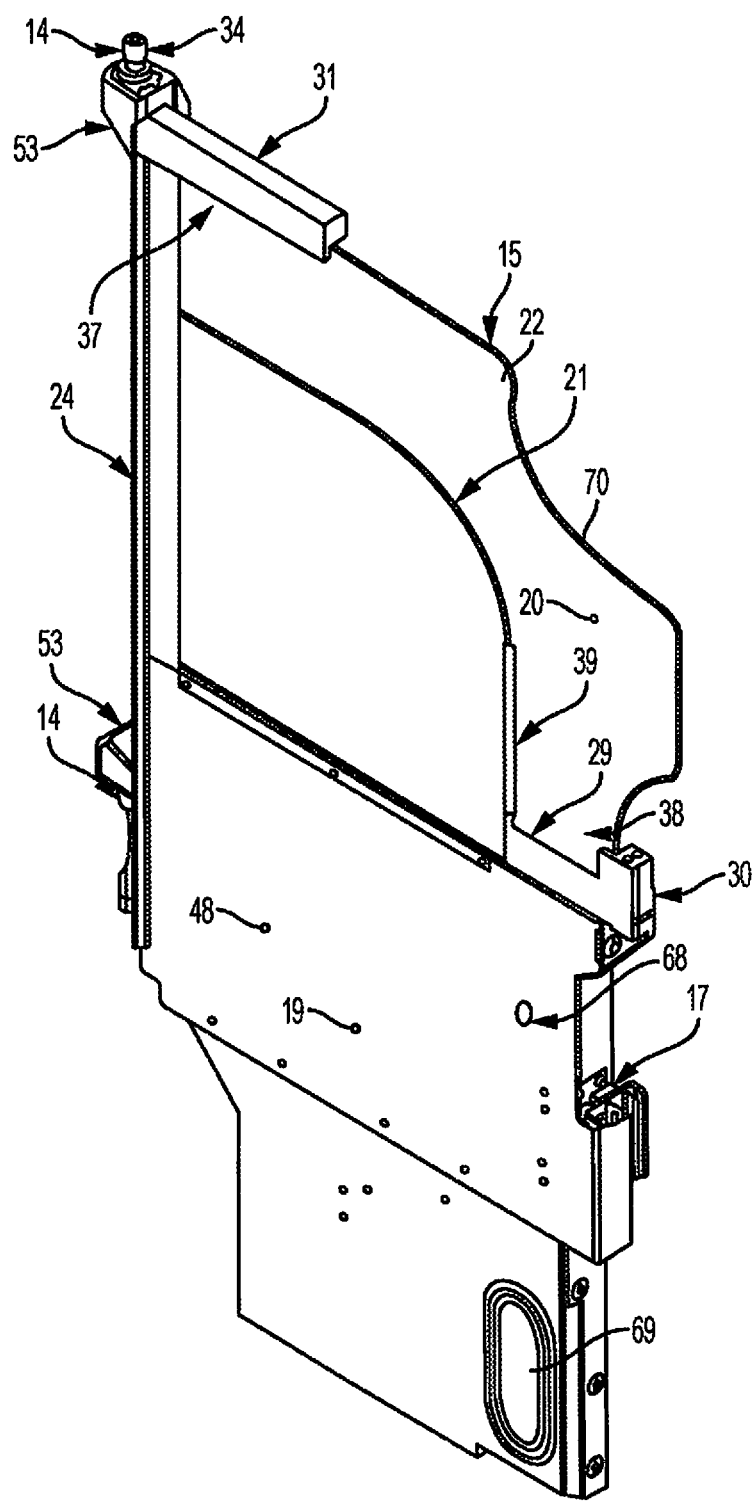
FIG. 4 is an exterior side perspective view of the barrier door of the protective enclosure of FIG. 1.
Figure 5:
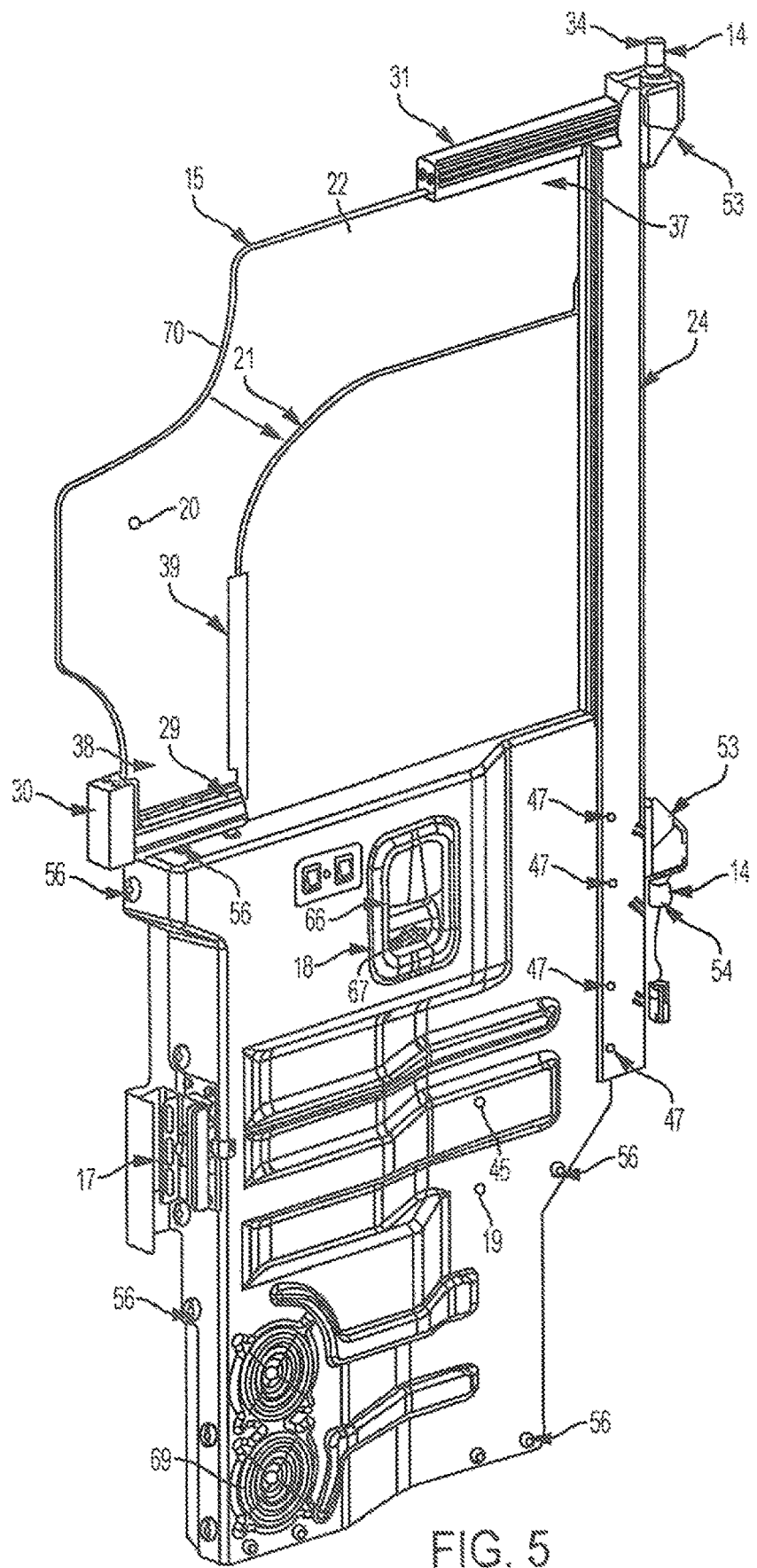
FIG. 5 is an interior side perspective view of the barrier door of FIG. 4.
Figure 6:
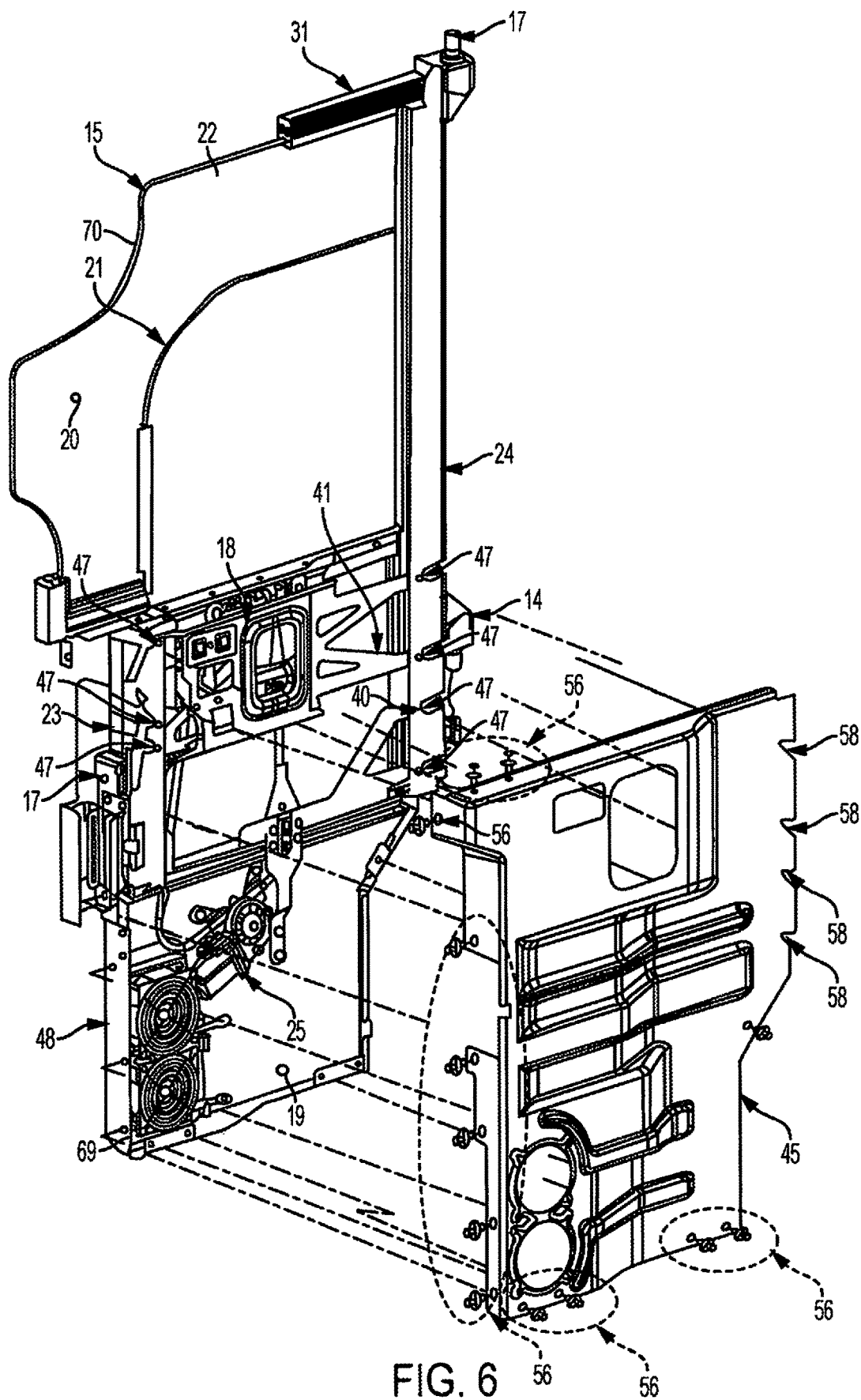
FIG. 6 is an interior side perspective view of the barrier door of FIG. 4 with the lower section exploded.

As shown in FIG. 4, the exterior side of the barrier door may be provided with an additional unlatch control 68, such as a keyed quarter-turn latch or a quarter-turn latch using a square key, which allows for access to the protective enclosure 10 from the outside. The exterior unlatch control is locked and would require a key, pass card, etc. or a specific or specialized tool, such as a square tool key, hex key, hex wrench, etc. to unlock or actuate the unlatch control. The driver is provided with an appropriate key, device, or tool to allow easier access to the protective enclosure from outside. Emergency services personnel may also be provided with the key, device, or tool. The interior latch release control is also accessible from the outside in the event of an emergency.

As shown in FIGS. 3-6 and 12, the barrier door may include a ventilation system 69 disposed in a lower section 19 of the barrier door. The ventilation system is configured to direct air to or from the protective enclosure. Additional details concerning the ventilation system will be provided below with respect to the example of FIGS. 18-25.

As shown in FIGS. 1-6 and 12, the barrier door includes the lower section 19 and an upper section 20 disposed above the lower section. The lower section may be made from a rigid opaque material, such as steel or similar metal material or a plastic material, but may incorporate windows or transparent sections. The upper section includes an outer stationary portion 22 or outer window and an inner movable portion 21 or inner window disposed within the outer stationary portion 22. As shown, the outer stationary portion surrounds the forward and upper sides of the inner movable portion and extends across and beyond the width of the lower section in order to form a larger barrier to limit outside interference with the driver from unruly passengers or potential attackers. The outer stationary portion may include a cut-out or shaped portion 70 that provides the driver with an unobstructed view of a side view mirror on the right side of the exterior of the bus.

The outer stationary portion and the inner movable portion are made from a light transmissive material, in particular, a transparent material, such as laminated glass or polycarbonate. It is to be appreciated that the outer stationary portion and/or the inner movable portion or portions thereof may be translucent rather than fully transparent. The inner movable portion is movable in a vertical direction and is coupled to a lift device 25, which may be an electromechanical lift device or window regulator, disposed in the lower section 19. The lift device is configured to move the inner movable portion between a lowered position in which the inner movable portion is at least partially withdrawn into the lower section to form an opening in the upper section, and a raised position in which the inner movable portion is extended upwardly to close the opening. The lower section may incorporate controls for operating the electromechanical lift device to raise and lower the inner movable portion, as will be discussed in additional detail below with reference to the example of FIGS. 26-35.

With reference to FIGS. 4-12, the barrier door may also include a forward channel structure formed by a vertically extending extruded support beam 23 and a rearward channel structure formed by another vertically extending extruded support beam 24. The forward channel structure and the rearward channel structure extend vertically to slidably support the inner movable portion 21 between the raised and lowered positions. As shown, the forward channel structure formed by the forward support beam 23 is disposed entirely in the lower section 19 and the rearward channel structure formed by the rearward support beam 24 includes a portion disposed in the lower section and another portion disposed in the upper section 20. In particular, the rearward support beam 24 forming the rearward channel structure extends the entire height of the barrier door 15 such that the rearward support beam 24 has a lower section in which the inner movable portion 21 slides and an upper section in which the outer stationary portion 22 is supported above the inner movable portion.

The forward and rearward support beams 23, 24 each incorporate a channel structure having three T-shaped slots. The T-shaped slots in the forward support beam and in the lower section of the rearward support beam have cushioning strips 26 disposed therein. The cushioning strips are configured to slidably support the inner movable portion 21 within the forward and rearward support beams. According to one example of the present disclosure, the cushioning strips are formed from strips of pile lined rubber over steel. The cushioning strips within the T-shaped slots create a run channel through the inner movable portion 21 slides and is supported.

Figure 7:
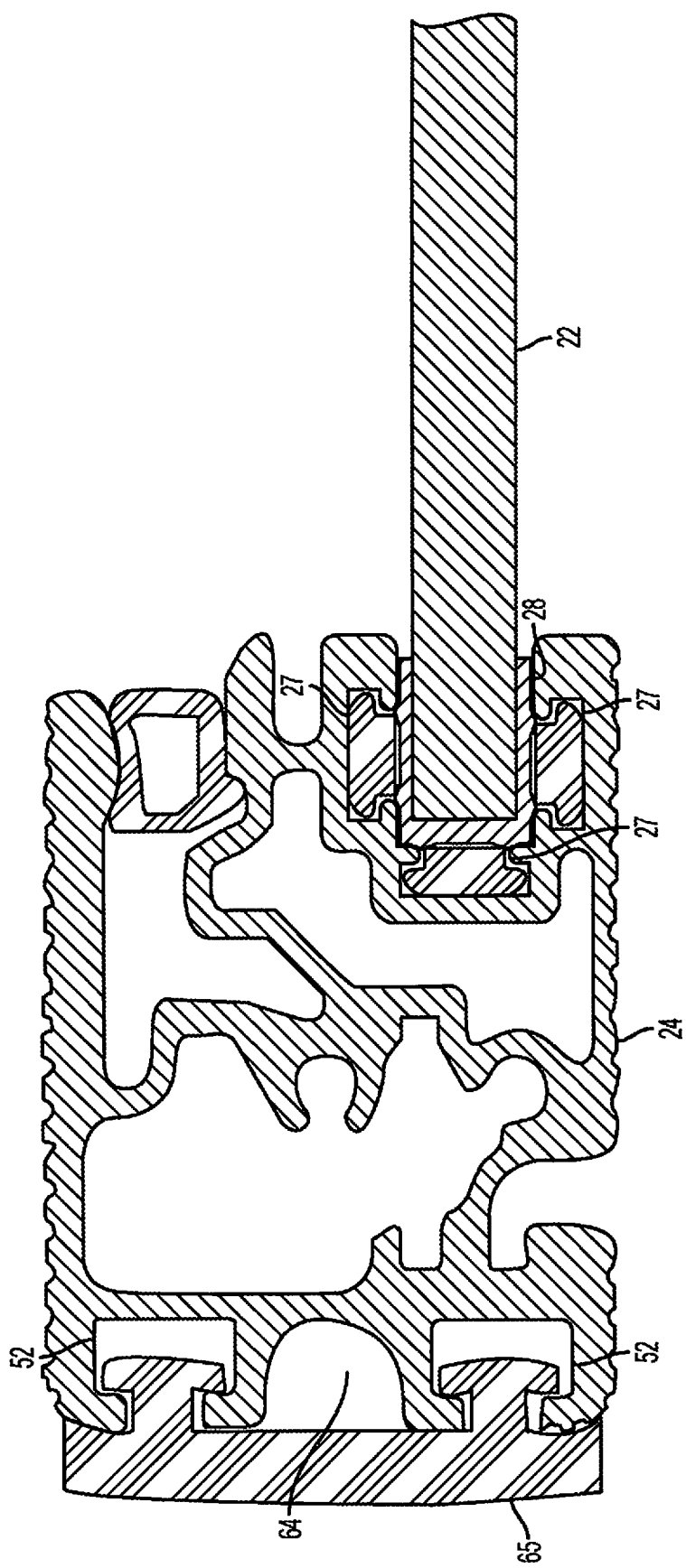
FIG. 7 is a cross-sectional view of the engagement between a rearward support beam and an outer stationary window of the barrier door of FIG. 4.
Figure 8:
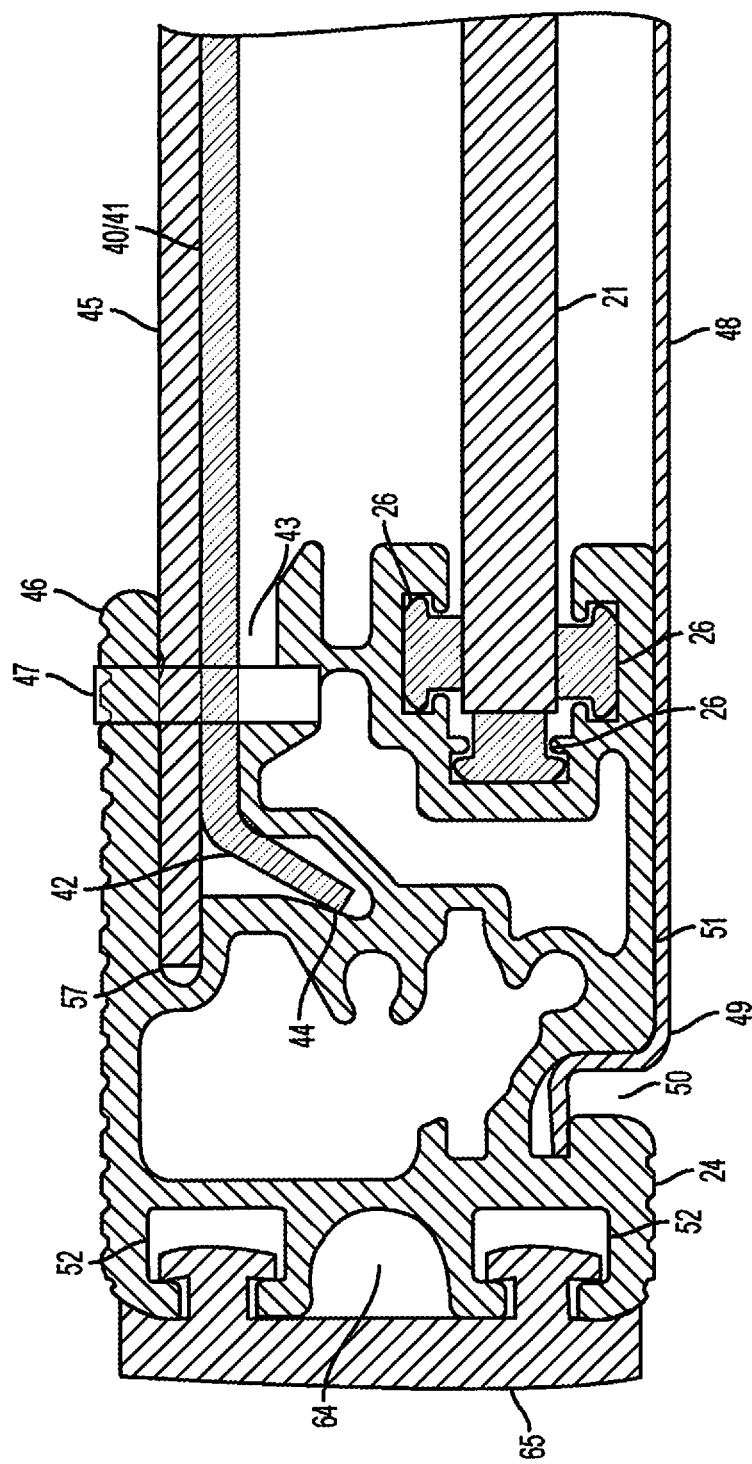
FIG. 8 is a cross-sectional view of the engagement between the rearward support beam, an inner movable window, and interior and exterior panels of the barrier door of FIG. 4.
Figure 9:
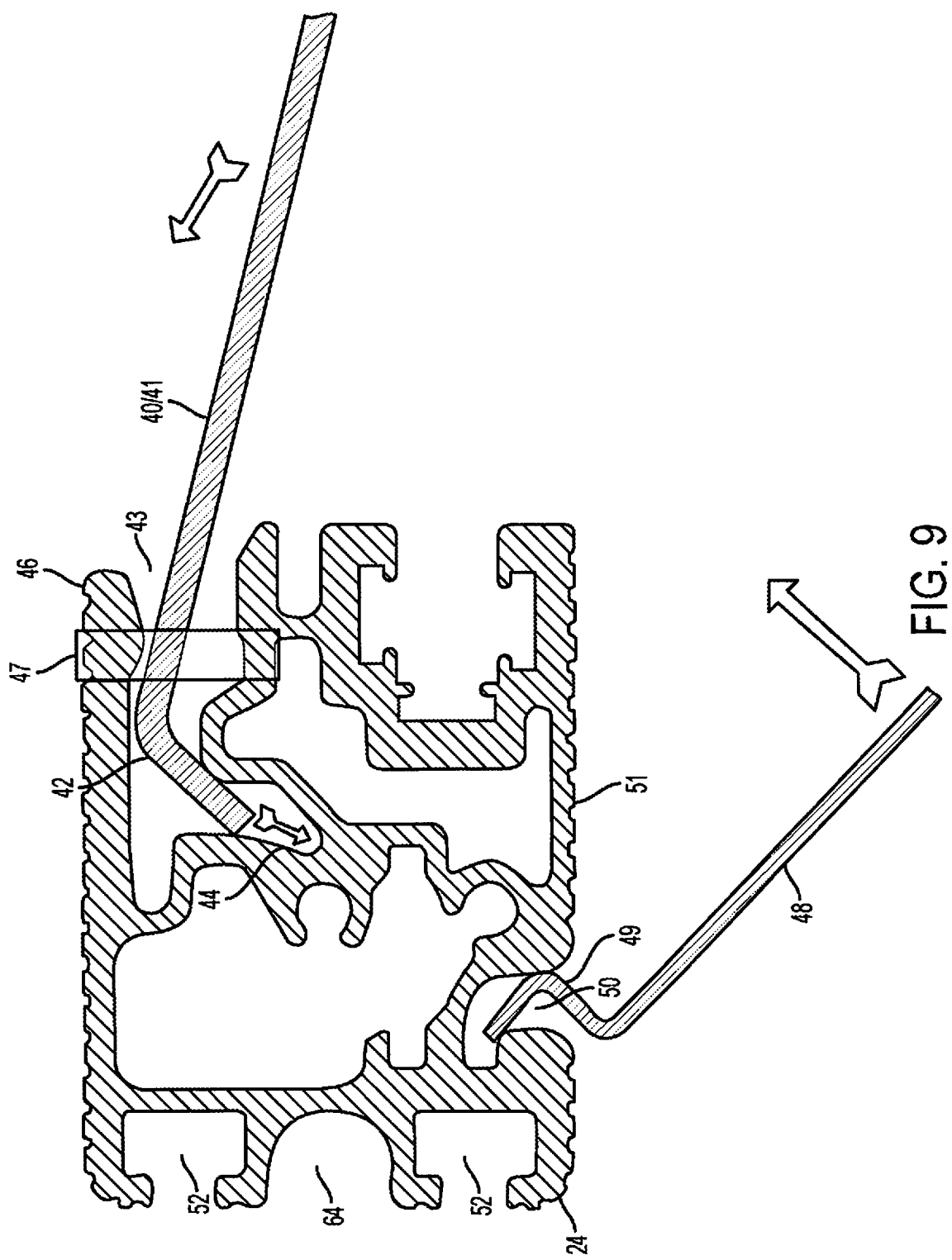
FIG. 9 is a cross-sectional view demonstrating the assembly of the interior and exterior panels on the rearward support beam of the barrier door of FIG. 4.
Figure 10:
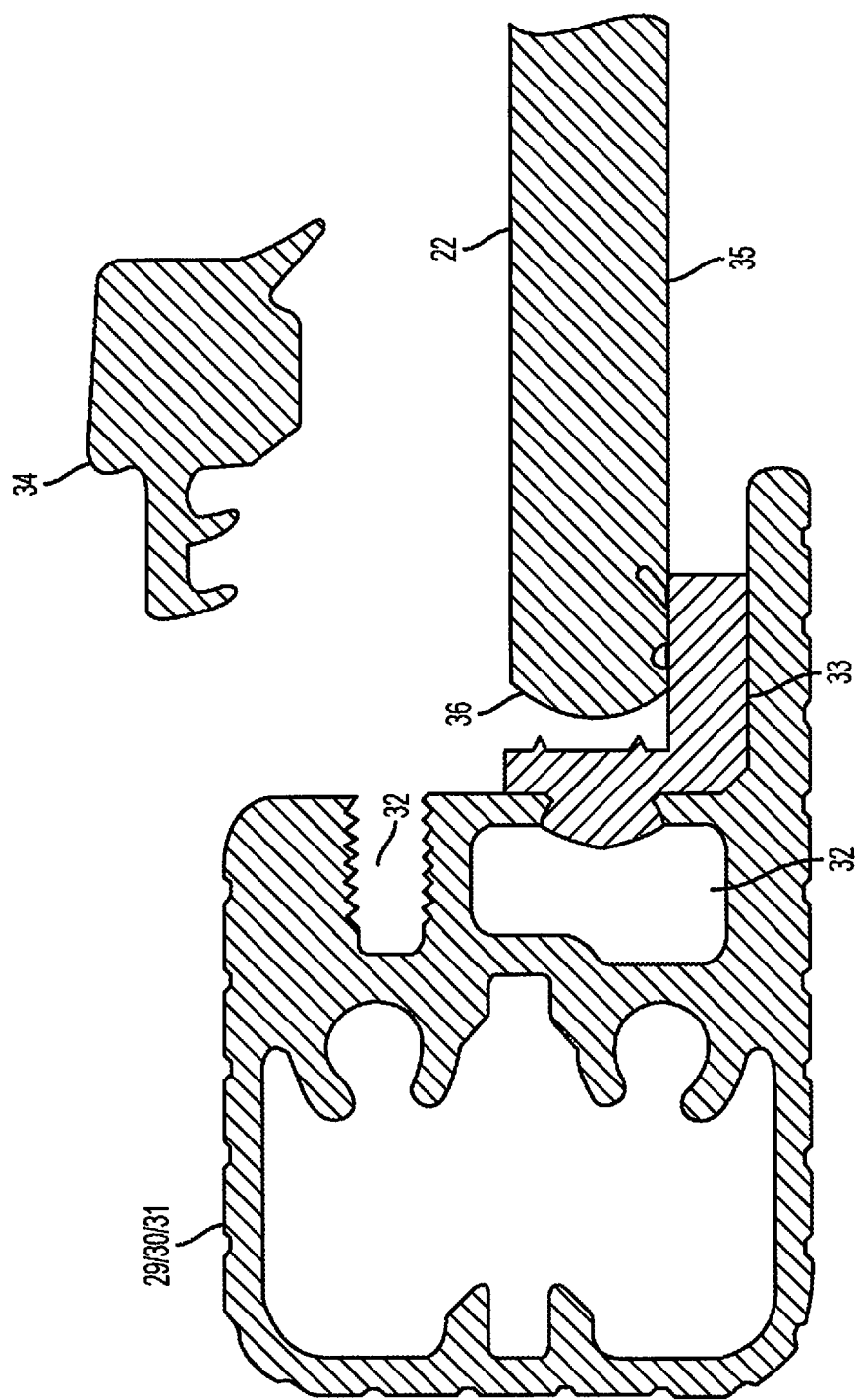
FIG. 10 is a cross-sectional view demonstrating the assembly of the outer stationary portion to securing beams of the barrier door of FIG. 4.
Figure 11:
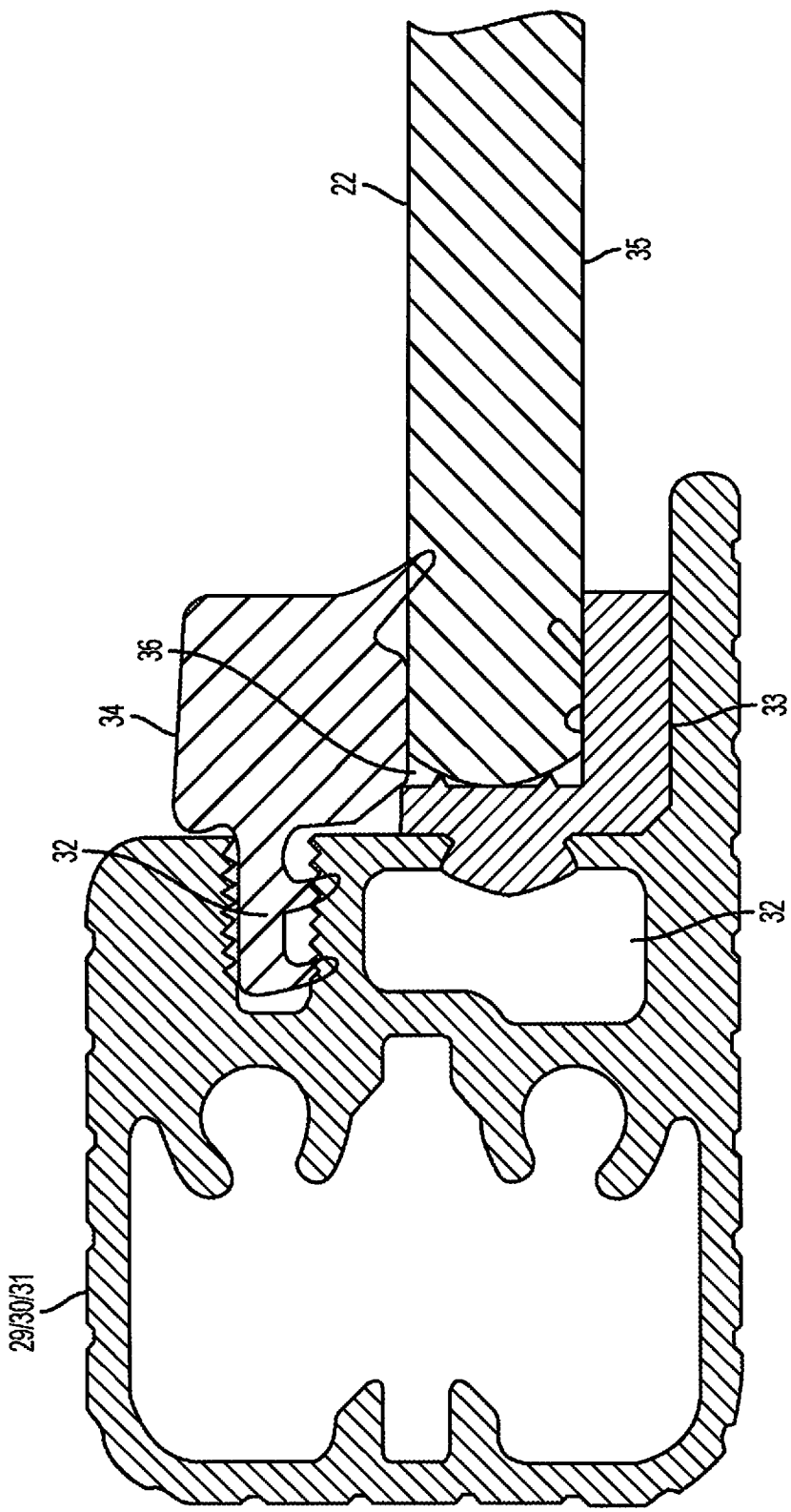
FIG. 11 is a cross-sectional view of the engagement between the outer stationary portion and the securing beams of the barrier door of FIG. 4.
Figure 12:
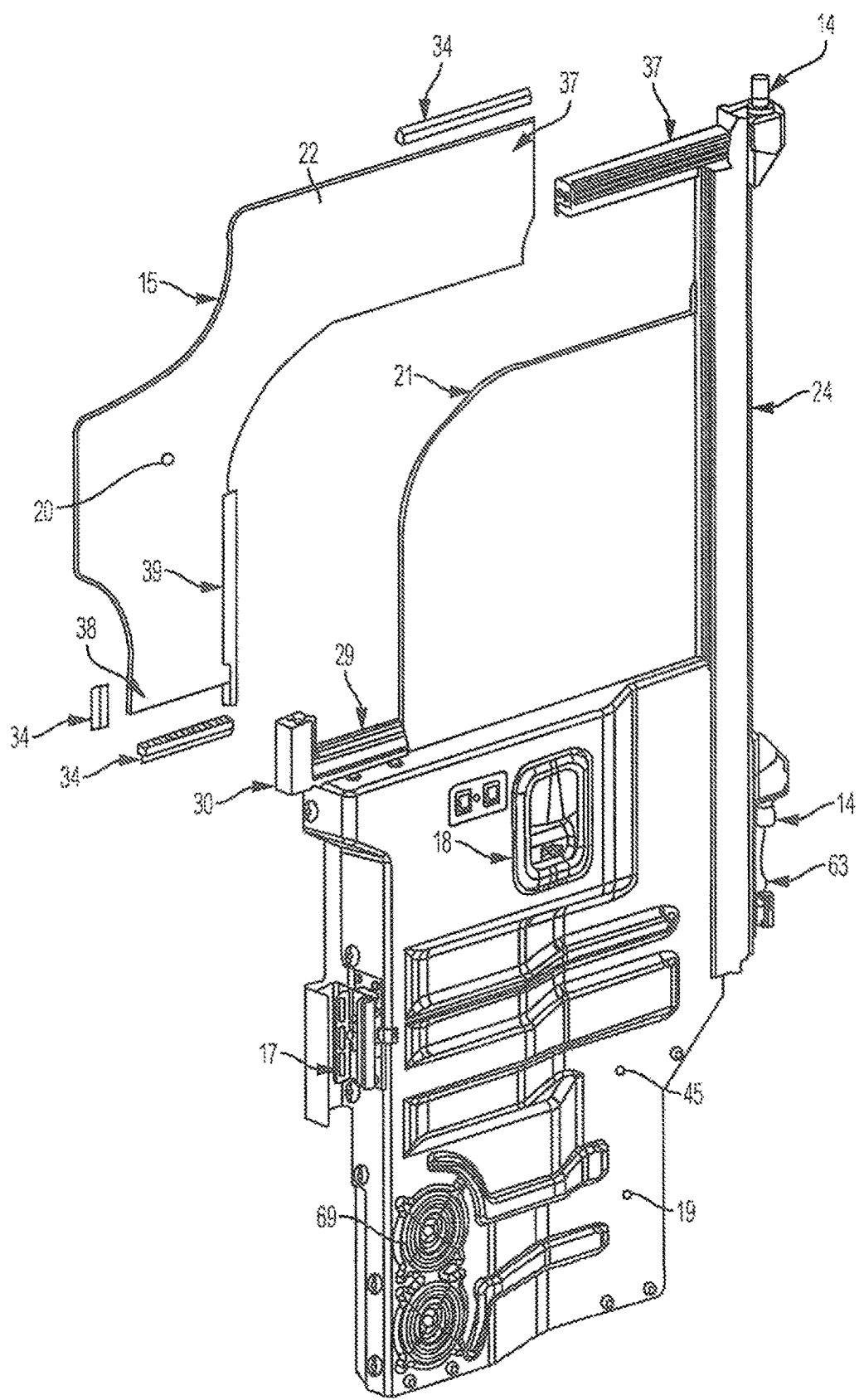
FIG. 12 is an interior side perspective view of the barrier door of FIG. 4 with the upper section exploded.
Figure 13:
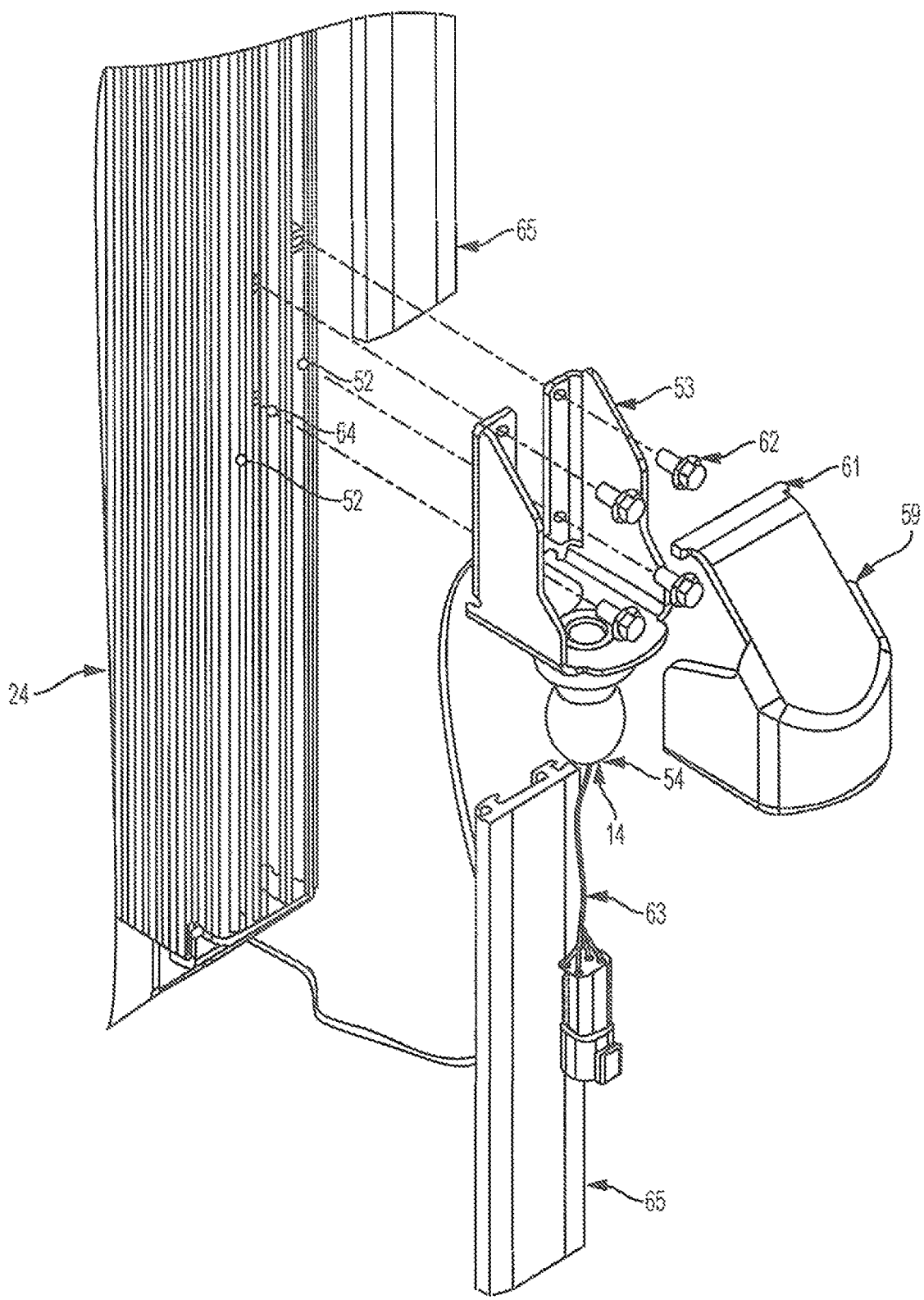
FIG. 13 is an exploded perspective view of the hinge structure of the barrier door of FIG. 4.
Figure 14:
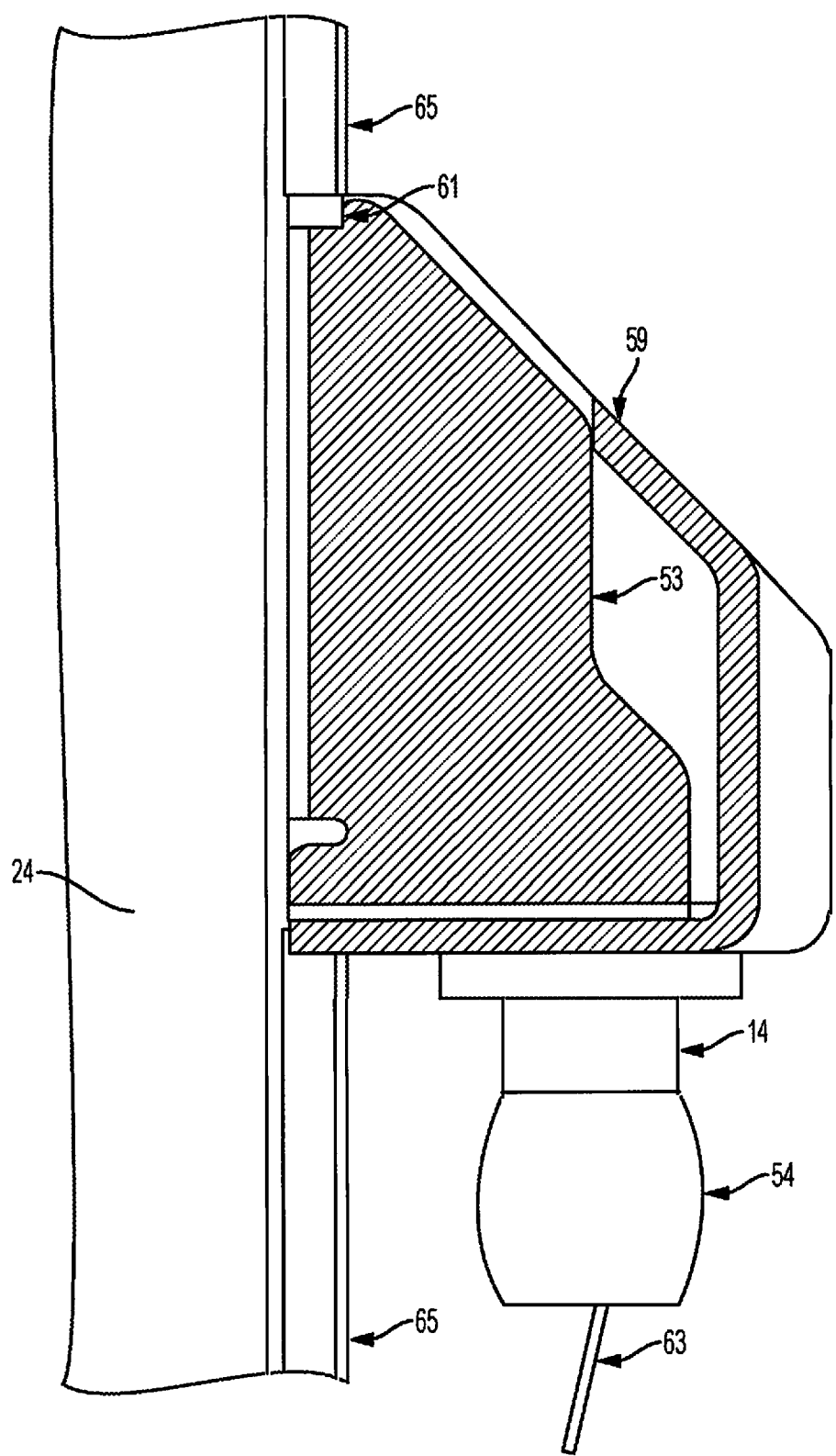
FIG. 14 is a cross-sectional view of the hinge structure of FIG. 13.
Figure 15:
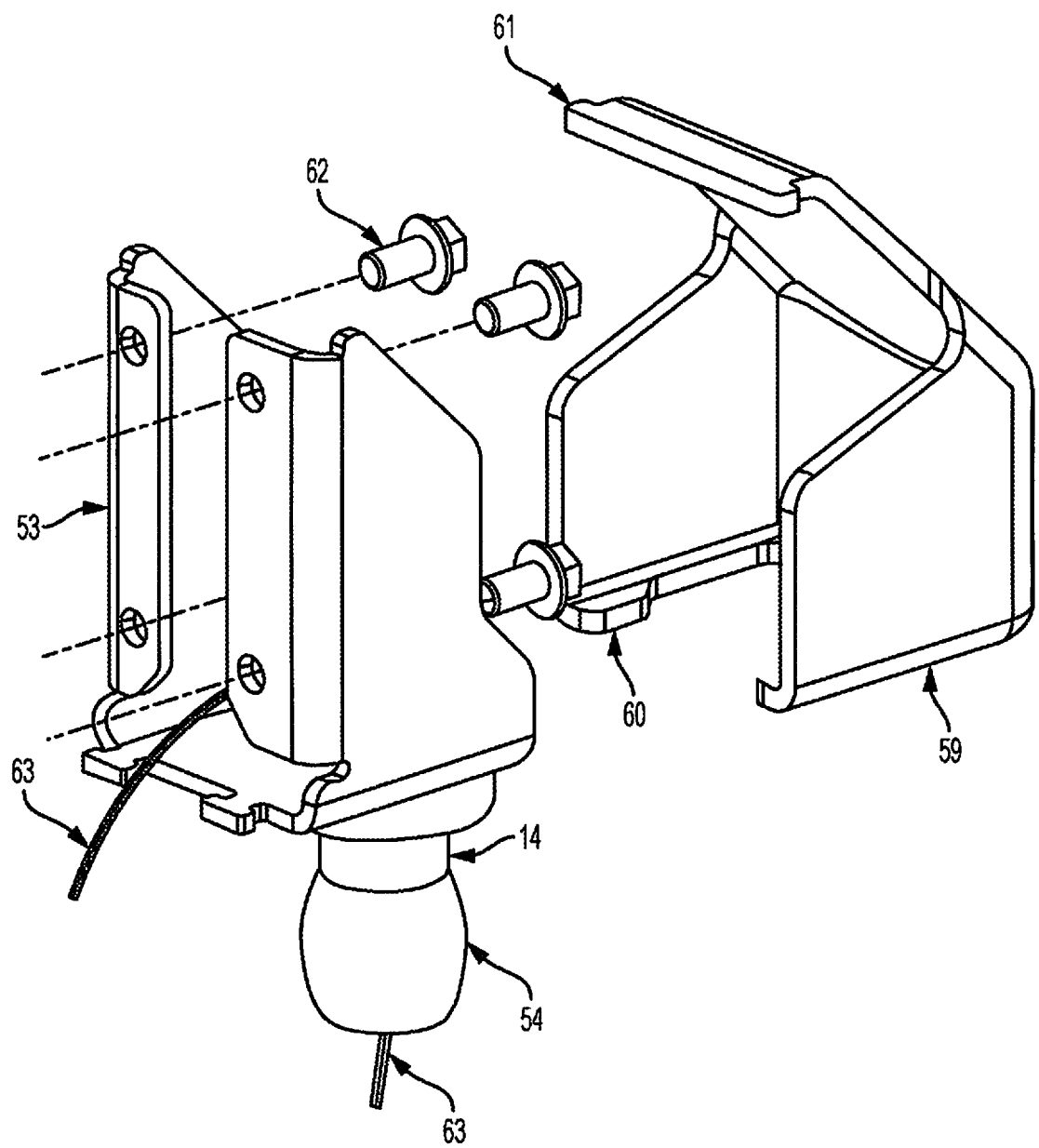
FIG. 15 is another exploded perspective view of the hinge structure of FIG. 13.

As shown in FIG. 7, the T-shaped slots in the upper section of the outer stationary portion 22 may include filler plugs 27 placed therein. The outer edge of the outer stationary portion may be wrapped with standard rubber setting tape 28, lubricated with standard glass setting lubricant and inserted into the channel defined by the filler plugs such that the filler plugs and setting tape support the outer stationary portion within the rearward support beam 24. The setting tape cushions the edge of the outer stationary portion and provides some retention force to the outer stationary portion.

With reference to FIGS. 4-6 and 10-12, the upper section 20 includes a plurality of extruded beams 29, 30, 31 that mount and retain the outer stationary portion 22 on the lower section 19. Two of the beams 29, 30 are affixed together using extruded screw receptacles to form a corner at the forward side of the barrier door 15 and secured to a location on the upper section forward of the inner movable portion. The corner formed by the two beams may be configured to hold a lower, forward corner 38 of the outer stationary portion. Another horizontal extruded beam 31 is affixed in a pocket near the top of the rearward support beam 24 and cooperates with the rearward support beam 24 to form a second corner at the rearward side of the barrier door opposite to the first corner. The corner formed by the beam 31 and the rearward support beam 24 holds an upper, rearward corner 37 of the outer stationary portion. The three beams 29, 30, 31 may each define channels 32 that receive and retain retention flanges of an outer clip 33 and an inner clip 34 of two extruded elastomer pieces. The inner clip 34 and the outer clip 33 hold the outer stationary portion 22 therebetween. The outer clip sits in a corner formed by the body and an outer flange of the beams 29, 30, 31 to act as a cushion between the extruded beams 29, 30, 31 and both an outer face 35 of the outer stationary portion 22 and an outer edge 36 of the outer stationary portion. The outer stationary portion, once inserted into the channel of the rearward support beam, is positioned to be enclosed at its opposing corners 37, 38 by the outer clips 33. The inner clips 34 may then be inserted into the corresponding channels 32. The inner clips may be configured to create a pinching retention force on the outer stationary portion to hold the outer stationary portion in position. Accordingly, the outer stationary portion can be mounted on the assembly of the door without the need for adhesives, or for holes or notches to be formed in the outer stationary portion, which might weaken its structural integrity. In the event that the outer stationary portion is damaged, such as through vandalism, the configuration of the inner and outer clips 34, 33 in the beams 29, 30, 31 may allow for replacement of the outer stationary portion 22 without the need for special tooling.

The outer stationary portion 22 includes a channel 39 made from a light transmissive material, such as a clear plastic, installed along an inner vertical wall that acts as a guide and support to the forward edge of the inner movable portion 21 as it extends above the forward support beam 23.

With reference to FIGS. 4-6, 8, 9, and 12, the lower section 19 of the barrier door 15 includes an interior panel 45 defining an interior side of the lower section and an exterior panel 48 defining an exterior side of the lower section. The rearward support beam 24 has multiple channels that act as receptacles for the structural and close-out panels of the lower section of the barrier door. Internal skeletal braces 40, 41 incorporate angled flanges 42 at the ends, which can be installed on a respective channel of the forward support beam 23 and the rearward support beam 24 by being inserted into a receiving channel 43 formed in each of the forward and rearward support beams 23, 24. The opening of the receiving channel is wider than the thickness of the skeletal braces 40, 41, allowing the tips of the flanges 42 to be oriented and then inserted into slots 44 inside the interior of the channels. The angled flange is under-bent such that when the skeletal braces are rotated into the final installed position, the tip of the angled flange 42 provides a positive retention force to hold the skeletal braces in position against vibration and to reduce an amount of rattle. The interior panel 45 or flat insert, which may be made from a plastic material, may be subsequently inserted into the receiving channel 43. The interior panel 45 is pinched against the skeletal braces by a spring force of an outer flange 46 of the respective support beam 23, 24 to further secure the skeletal braces in the channel and substantially prohibits the tip of the angled flange from backing out of the inner slot 44. Slots in the skeletal braces pass over fixed pins 47 in the respective support beam that secure the vertical position of the skeletal braces. A similar mounting arrangement may be used to secure the skeletal braces to the forward support beam 23 with a flat insert (not shown) provided in place of the interior panel 45.

The interior panel 45 may provide a cosmetic close-out to the inner face of the lower section 19 of the barrier door 15. The panel provides a finished appearance to the barrier door and acts as a barrier to protect foreign objects, such as the fingers, clothing, tools, etc., from entering and damaging or being damaged by the internal mechanisms of the barrier door. The interior panel incorporates a plurality of quick release fasteners 56 to allow the interior panel to be removed easily if service, repairs, or replacement are required. The rearward flange of the interior panel is secured by inserting the flange into the receiving channel 43 that also receives the skeletal braces. A receiving slot 57 formed within the receiving channel acts to secure the interior panel 45 while the spring forces from the outer flange 46 of the rearward support beam 24 will pinch the interior panel against the skeletal braces to both reduce an amount of rattling of the interior panel and further substantially secure a position of the skeletal braces. The frictional forces and the quick release fasteners 56 ensure that the interior panel 45 does not come out of the receiving slot 57 during operation. The interior panel incorporates cutouts 58 which slide over the pins 47 in the rearward support beam 24 to provide vertical positioning of the interior panel.

Figure 16:
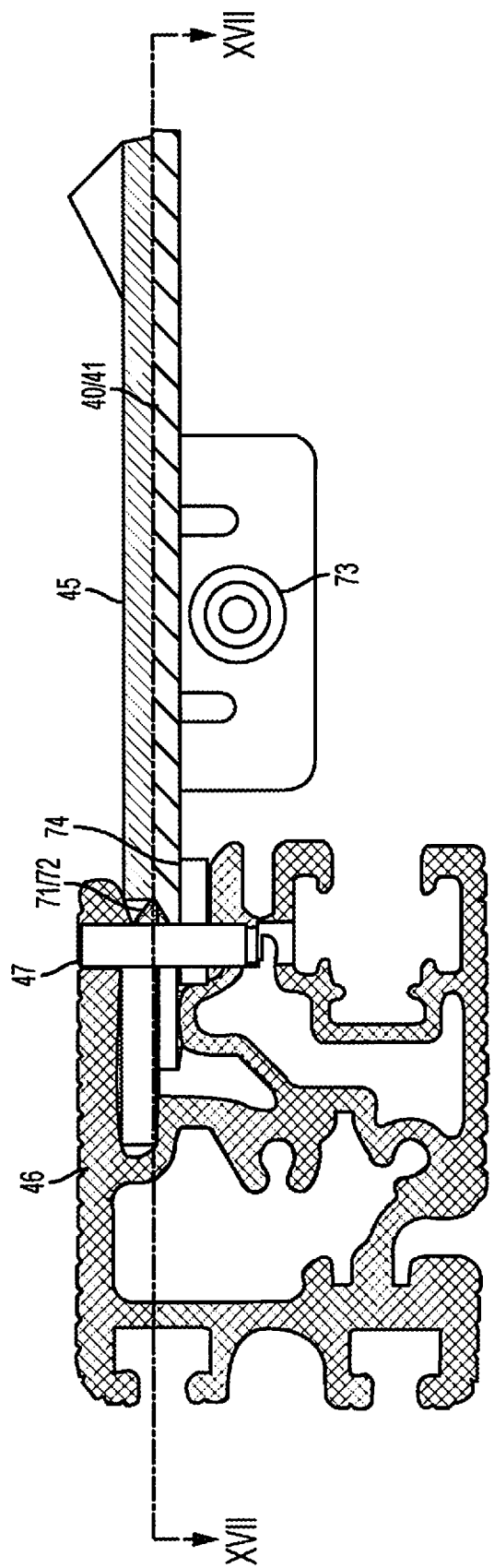
FIG. 16 is a cross-sectional view taken along lines XVI-XVI shown in FIG. 17 of the engagement between the inner side panel and the rearward support beam of the barrier door of FIG. 4 according to an alternative example of the present disclosure.
Figure 17:
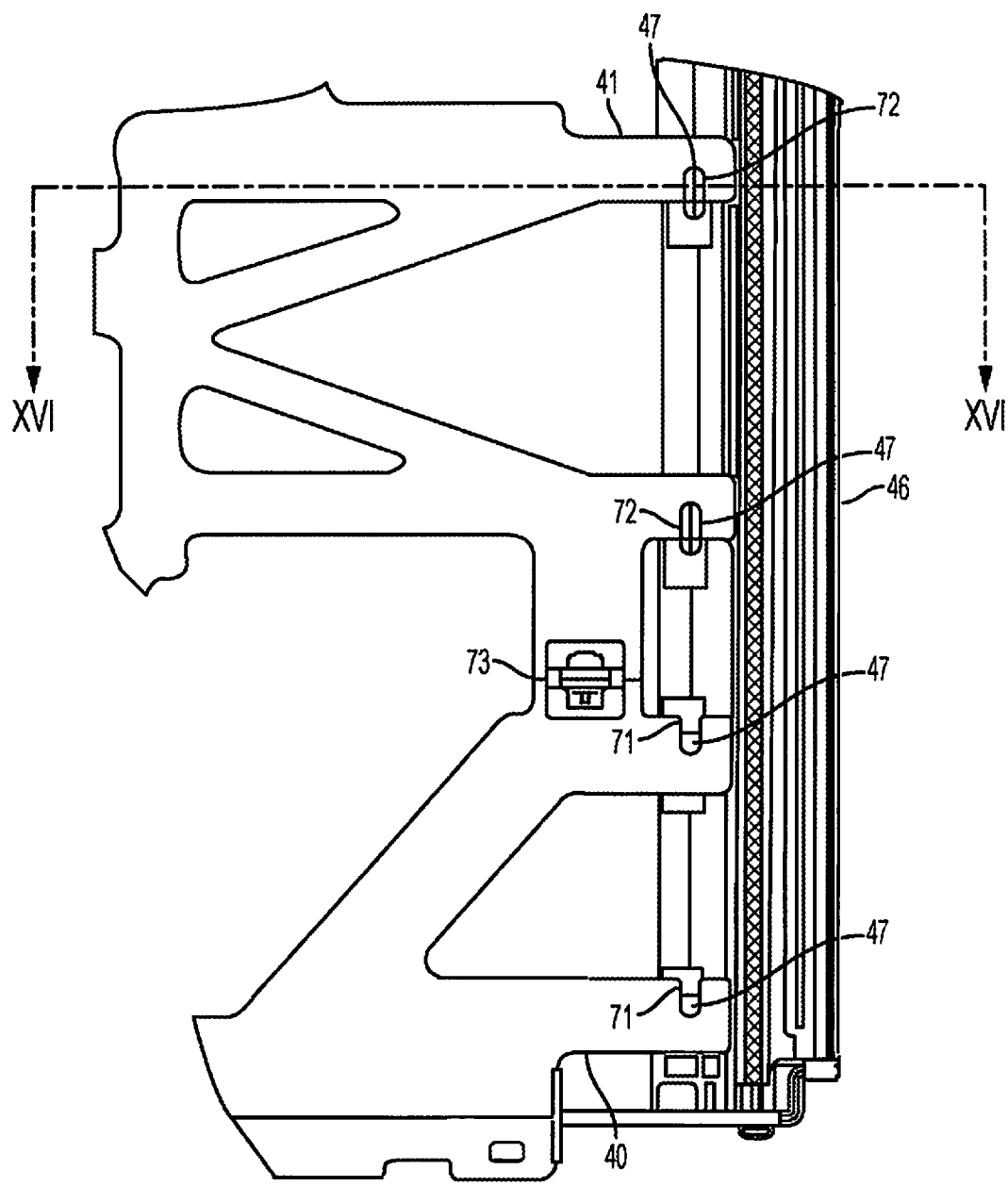
FIG. 17 is a cross-sectional view taken along lines XVII-XVII shown in FIG. 16 of the engagement between skeletal braces and the rearward support beam and the barrier door of FIG. 4 according to the alternative example of the present disclosure.

With reference to FIGS. 16 and 17, according to an alternative example of the present disclosure, the internal skeletal braces may have ends with hook openings 71, 72 formed at the ends thereof such that, when inserted into the receiving channels 43 in the forward and rearward support beams 23, 24, the hook openings pass over and engage the fixed pins 47. Because the resulting forces supporting the skeletal braces are mostly horizontal, most of the support force bears across the hook openings into the fixed pins. The upper skeletal brace 41 may have two hook openings 72 in a generally downward orientation such that a lower portion of the brace stabilizes the connection to the forward or rearward support beam 23, 24 and allows the skeletal brace to be installed first and not move while the remaining retention devices are installed. The lower skeletal brace 40 may also have hook openings 71 that are generally facing downward for the same reason. However, the lower skeletal brace may instead be provided with upward facing hook openings 72, as shown, such that the lower skeletal brace 40 can be installed and secured against the upper skeletal brace 41 with a bolted flange 73 or similar joint, thus locking the two skeletal braces together and preventing the hook openings from disengaging the pins 47. The hooked openings may be tapered to increase a retention of the pins 47.

As discussed above with respect to the example of FIGS. 8 and 9, the interior panel 45 or a flat insert may be inserted in the receiving channel 43 along with the skeletal braces to reduce rattling. An additional pad 74 made from a vibration absorbing material may be inserted into the opposite side of the receiving channel 43 to further reduce vibration. The hook openings and the bolted flange 73 are sufficient to retain the skeletal braces on the forward and rearward support beams 23, 24. Accordingly, the interior panel 45 may be installed in a separate channel formed in the forward and rearward support beams.

With reference to FIGS. 4-6, 8, 9, and 12, the exterior panel 48 of the lower section 19 of the barrier door 15 includes an S-curved end 49 along the rear edge that allows the exterior panel to be inserted at an angle into a L-shaped groove 50 and then rotated to an installed position to lay against an outer face 51 of the rearward support beam 24. The tip of the curved end may be over-bent such that, when the exterior panel 48 is rotated to the installed position, the tip of the curved end provides a positive retention force to secure the exterior panel in position against vibration and to reduce an amount of rattling. Fasteners are provided to secure the forward end of the exterior panel and to maintain the tension of the rearward joint. A fastener in the base of the exterior panel, as well as the frictional forces from the tip of the curved end disposed within the groove 50, provides vertical support and positioning of the exterior panel.

With reference to FIGS. 3-9 and 12-15, the rearward support beam 24 incorporates a set of T-shaped slots 52 on the rearward side thereof that permit mounting, using T-shaped nuts or similar fasteners, of upper and lower adjustable brackets 53 of the hinge structure 14 on the rearward side of the support beam 24. One or more of the brackets may incorporate a spherical hinge pin 54 which interfaces with a fixed position flange bushing on a respective one of a set of mounting brackets 55, which may be fixed to the rear screen 11 or another part of the vehicle's structure. The spherical hinge pins are able to adapt to slight misalignments between the upper and lower adjustable brackets while the flange face of the lower spherical hinge pin provides vertical support for the barrier door. Mounting the adjustable brackets to the T-shaped slots on the rearward support beam 24 allows for adjustment of the vertical position of the barrier door and the spacing between the hinge pins to be simplified. The T-shaped slots may be structured or arranged to reduce an amount of slippage of the brackets under vibration (e.g., increase a amount of friction). The T-shaped slots may also be provided on the forward support beam 23 to mount some additional internal structure of the barrier door.

The hinge structure 14 may includes formed plastic covers 59 that slide or move over the adjustable brackets 53. The covers include flanges 60 that engage the pin side over the adjustable brackets and tabs 61 that slide over mating tabs in the adjustable brackets to provide a tamper-resistant structure for closing out the hinge structure that does not require tools to install. The covers may allow access to mounting screws 62 for the adjustable brackets and to a wiring harness 63 passing through the hinge structure. A central channel 64 is built into the rearward support beam 24 between the T-shaped slots 52 through which the electrical cabling of the wiring harness 63 can be routed. By placing the channel on the exterior face of the rearward support beam, the cable of the wiring harness can be routed without having to run it through a hole in the rearward support beam. A rubber finishing cap 65 may be provided on the rear face of the support beam above and below the adjustable brackets. The finishing cap includes features configured to engage the T-shaped slots. The finishing cap provides a cosmetic appearance and a protective cover for the channel accommodating the wiring harness. As shown in FIGS. 12-15, the wiring harness passes out of the rear screen 11 and into the interior of the lower section 19 of the barrier door 15 via the lower spherical hinge pin 54 and adjustable bracket 53 and into the channel 64 of the rearward support beam 24. It is to be appreciated that the wiring harness 63 may alternatively be passed through the upper spherical hinge pin and adjustable bracket.

With reference to FIGS. 18-25, a protective enclosure 100 for a vehicle is shown in accordance with another example of the present disclosure. As shown, the protective enclosure 100 is located in the front left portion of the vehicle (e.g., a bus). It is to be understood that other locations for the protective enclosure are possible. A rear screen 101 is located behind a seat of the vehicle within the protective enclosure to provide a separation between the rear of the protective enclosure and a separate section of the vehicle (e.g., a passenger section, a storage area, or the like). The rear screen 101 may be completely non-transparent, or it may incorporate windows or other transparent features therein. In one or more embodiments, adjacent to the protective enclosure may be a fare box 102, which enables passengers to pay fares while entering and exiting the vehicle.

Coupled to the rear screen 101 is a barrier door 107. The barrier door is configured to rotate about a hinge structure 105 which runs vertically between respective mounting points along an edge of the rear screen. As one example, the barrier door is placed at a sufficient distance from the entrance of the vehicle and a right wheel well 103 to allow for unhindered access to the vehicle for passengers, including those in wheelchairs. The barrier door may also be positioned above a floor level 104 so as to provide such adequate clearance. However, in alternative configurations, the barrier door may reach entirely to the floor level. Additionally, while the barrier door provides adequate clearance for passengers, it is also positioned at an adequate distance away from the position so as to comfortably provide the driver with access to all controls in the protective enclosure.

As noted above, the barrier door is configured to be coupled to an edge of the rear screen 101 via the hinge structure. The barrier door may be configured to rotate through the aisle (i.e., outward toward the passenger entrance) to be stowed against a left wheel well 106 located behind the rear screen 101. However, alternative methods of coupling and/or stowing the barrier door, such as a sliding mechanism or forward swinging door, are also possible.

Figure 18:
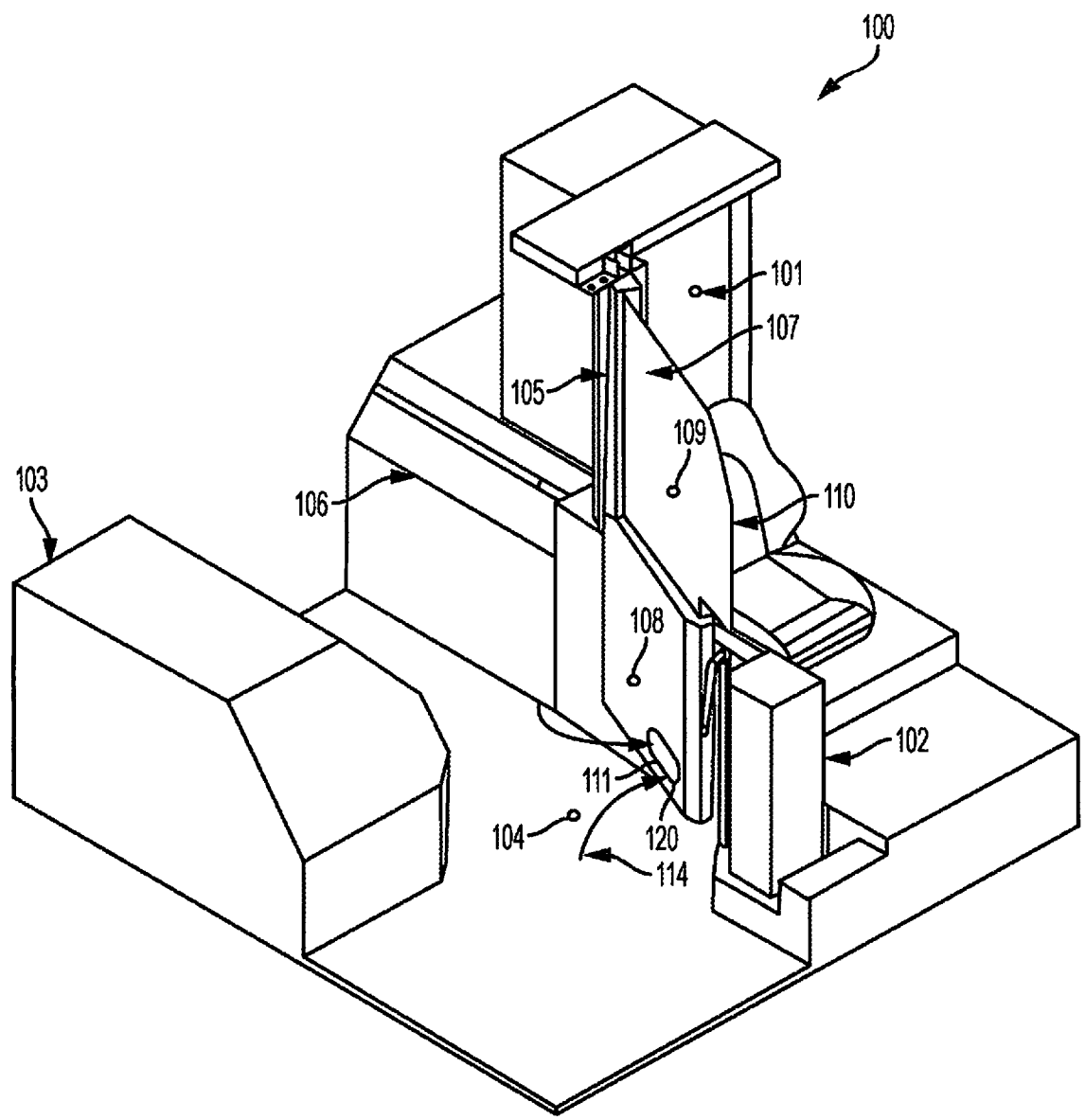
FIG. 18 is an exterior perspective view of a protective enclosure having a barrier door according to another example of the present disclosure.
Figure 19:
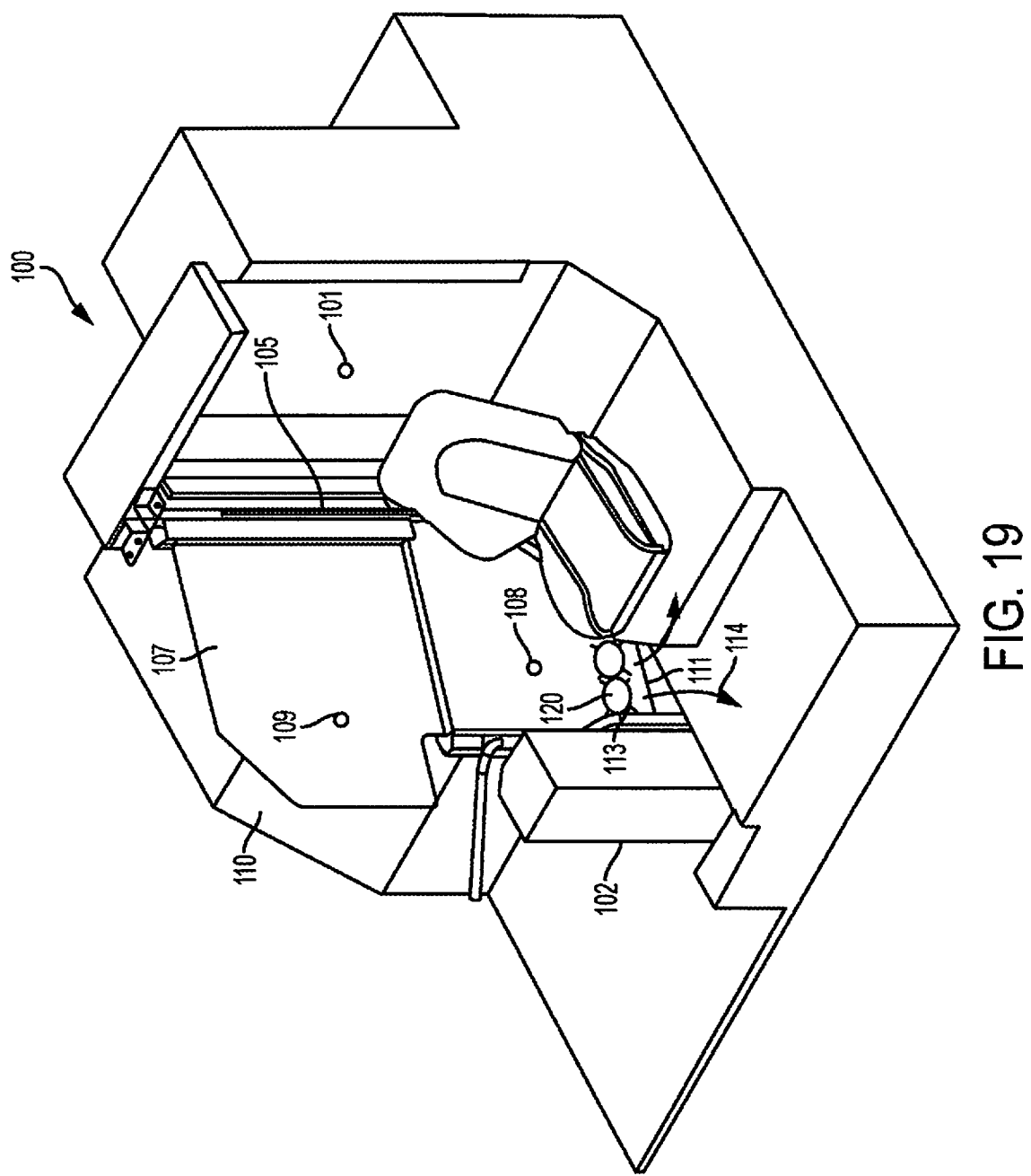
FIG. 19 is an interior perspective view of the protective enclosure of FIG. 18.
Figure 20:
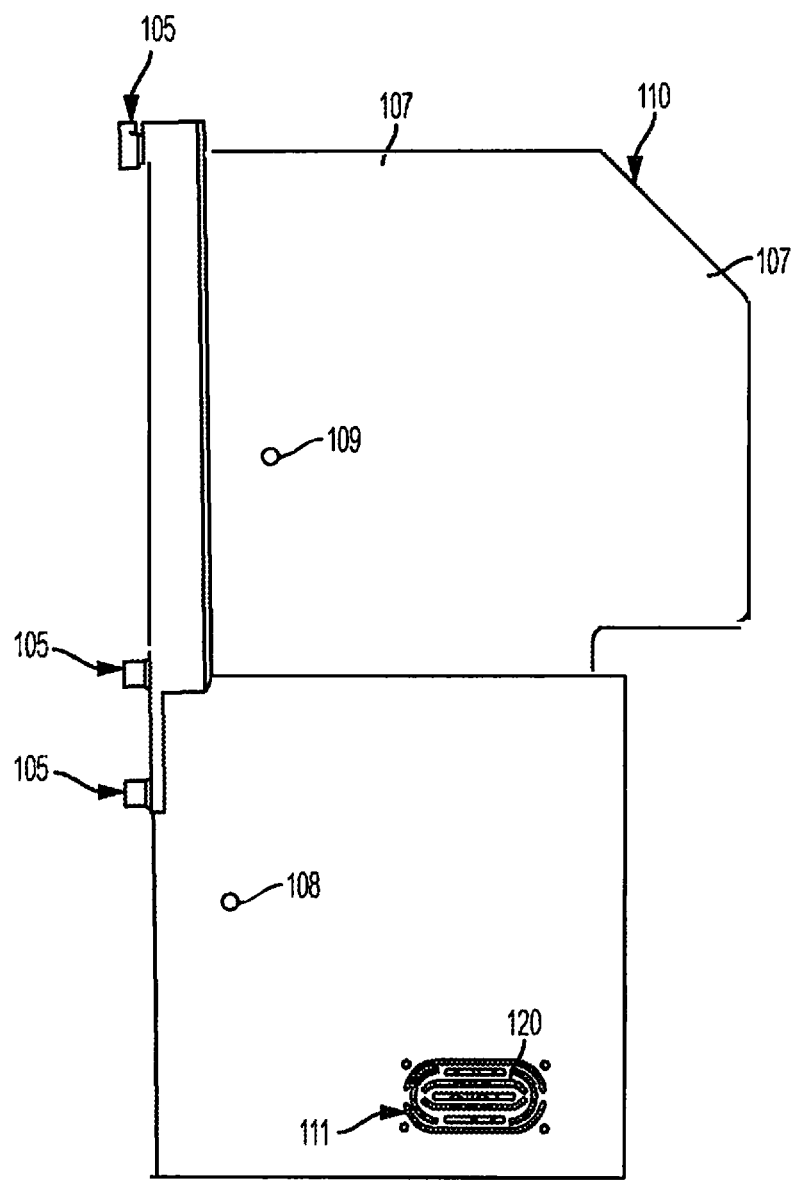
FIG. 20 is an exterior side view of the barrier door of the protective enclosure of FIG. 18.

As shown in FIGS. 18-20, the barrier door includes a lower section 108 and an upper section 109. The lower section may be made from a rigid, non-transparent material, such as steel or similar metal material or a plastic material. The lower section may also incorporate additional windows or transparent sections as found to be suitable. At least a portion of the upper section may be formed from a light transmissive material. In particular, the upper section may be formed from a transparent material, such as laminated glass, acrylic, polycarbonate, etc. A portion of the upper section may be retractable into the lower section, as discussed above with reference to the example of FIGS. 1-17. Additionally, the lower section and the upper section may be separately pivotable from one another along the hinge structure 105 to form a "dutch door" configuration. Alternatively, the lower section and the upper section may be permanently fixed together. The upper section may include movable panels to partially open the barrier door, a pass-through or cut-outs for communication with passengers and/or ventilation, or a variety of other configurations.

The upper section of the barrier door is configured to extend at least partially over the fare box 102, but does not necessarily extend so far as to connect with or engage the windshield at the front of the vehicle. The upper section also does not necessarily extend to the ceiling of the vehicle. In this way, the upper section may allow air to pass around the edges of the barrier door such as over the top of the barrier door 107 to promote air circulation through the protective enclosure 100. A cut-out 110 may also be incorporated in the upper section to provide the driver with an unobstructed view of the rear and side view mirrors of the vehicle. While such incomplete extension does leave portions of the protective enclosure open to the passenger area of the vehicle, the overall enclosure generally extends far enough around the position to provide adequate protection to the driver.

As shown in FIGS. 18-22, the lower section includes a ventilation system 120 therein. The ventilation system includes one or more electric blowers 111 in a plenum 112 located in a region 113 of the lower section. The one or more electric blowers are configured to create an air flow 114 into or out of the protective enclosure to provide for increased ventilation and driver comfort. The electrical wiring for the one or more electric blowers may be routed into the barrier door via any known method for providing electrical power within a hinged door. Particularly, the wiring may be routed into the lower section via the hinge structure 105 in the same manner as discussed above with reference to the example of FIGS. 1-17. Additionally, the electrical wiring to power and/or control the one more electric blowers may also be utilized to power other devices and accessories within the lower section of the barrier door, such as the electromechanical lift device for a powered, movable window panel. The controls for the one or more electrical blowers may be located on the barrier door or at a location remote from the barrier door.

According to one example of the present disclosure, the one or more electric blowers 111 of the ventilation system 120 may be configured to create a flow of air 114 into or out of the protective enclosure 100. If two or more electric blowers are utilized in the ventilation system, both blowers could be configured to create an air flow 114 in the same direction either into or out of the protective enclosure. Alternatively, the two electric blowers could be configured to each create an air flow in opposite directions, thereby enabling the driver to control the desired direction of the air flow based upon specific conditions within the protective enclosure. For example, the operator could choose to create an air flow into the protective enclosure using a first electric blower under a first condition, and create an airflow out of the protective enclosure using a second electric blower under a second condition while the first electric blower is directing air into the protective enclosure.

As shown in FIG. 21, the ventilation system may additionally be configured to create an upward air flow 115 through the barrier door. The plenum 112 in the lower section may be configured with a radial electric blower capable of creating the upward air flow through the interior of the lower section and across the interior side of the upper section. The air flow may be directed through the lower section using one or more baffles or channels located in the lower section. Furthermore, a mechanical damper may be incorporated into the lower section to enable the driver or operator to control the air flow. According to this example, the upward air flow blows along the upper section, as opposed to in a direction toward the operator, which may prevent an undesirable draft on the operator. Additionally, the air flow blowing upward along the upper section may act to reduce fogging of a transparent upper section under certain temperature conditions, such as a rush of warm, humid air into an air conditioned vehicle when the passenger doors are opened, as one example. As such, visibility for the operator through the upper section may not be compromised.

As discussed above, the ventilation system 69 of the barrier door 15 discussed above with reference to the example of FIGS. 1-17 may be of the same or similar construction and configuration as the ventilation system 120 of the barrier door according to the example of FIGS. 18-22.

Figure 23:
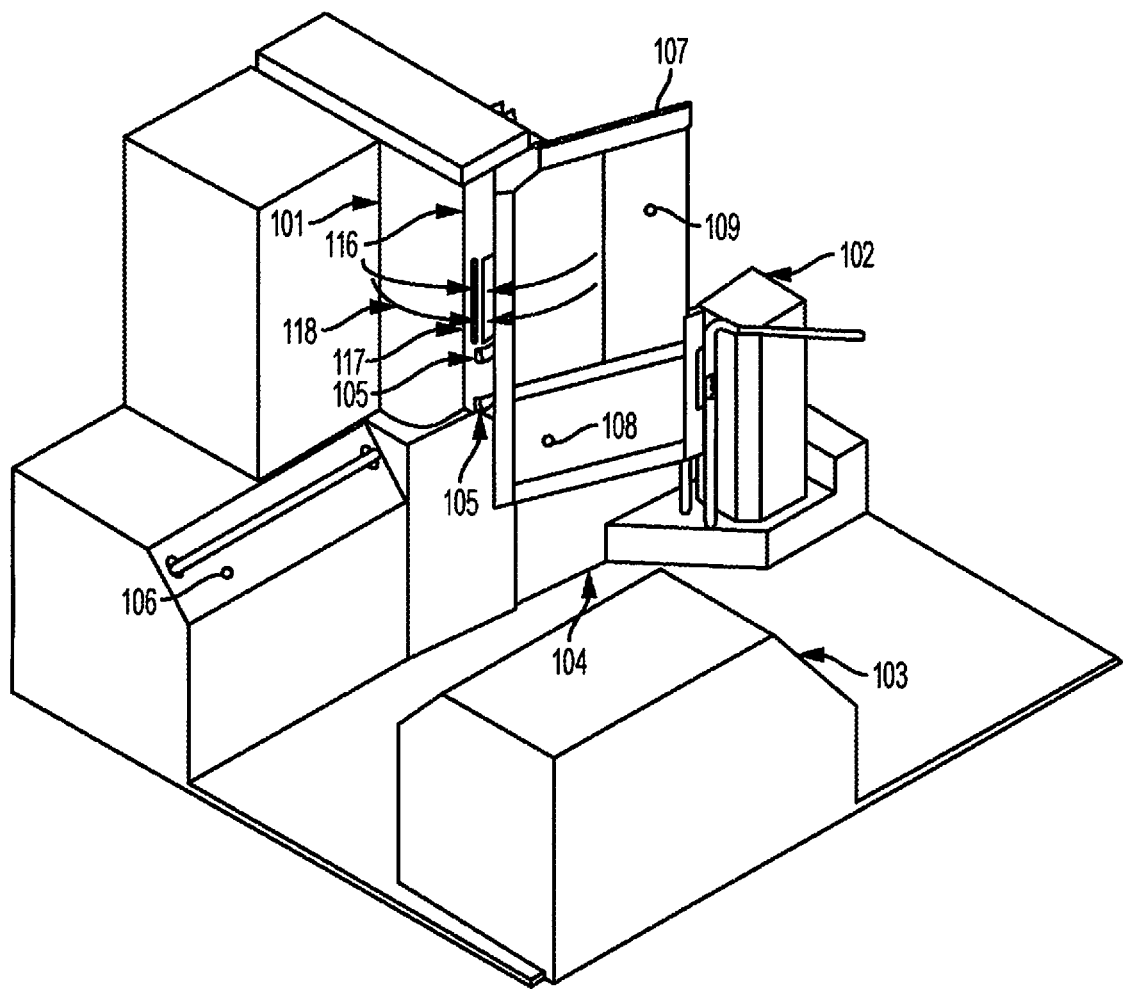
FIG. 23 is an exterior perspective view of the protective enclosure of FIG. 18 according to an alternative example of the present disclosure.
Figure 24:
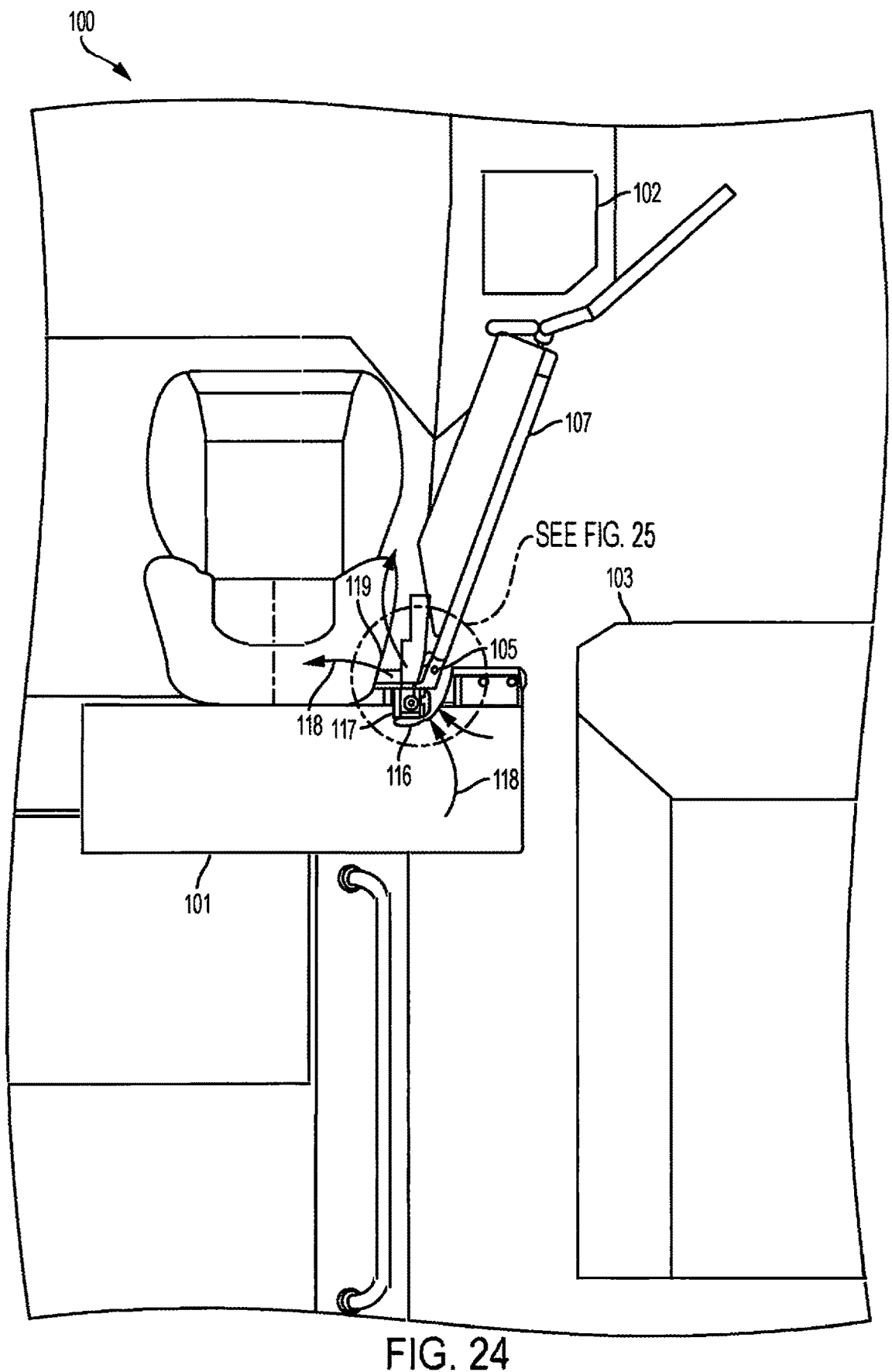
FIG. 24 is a top view of the protective enclosure of FIG. 23.
Figure 25:
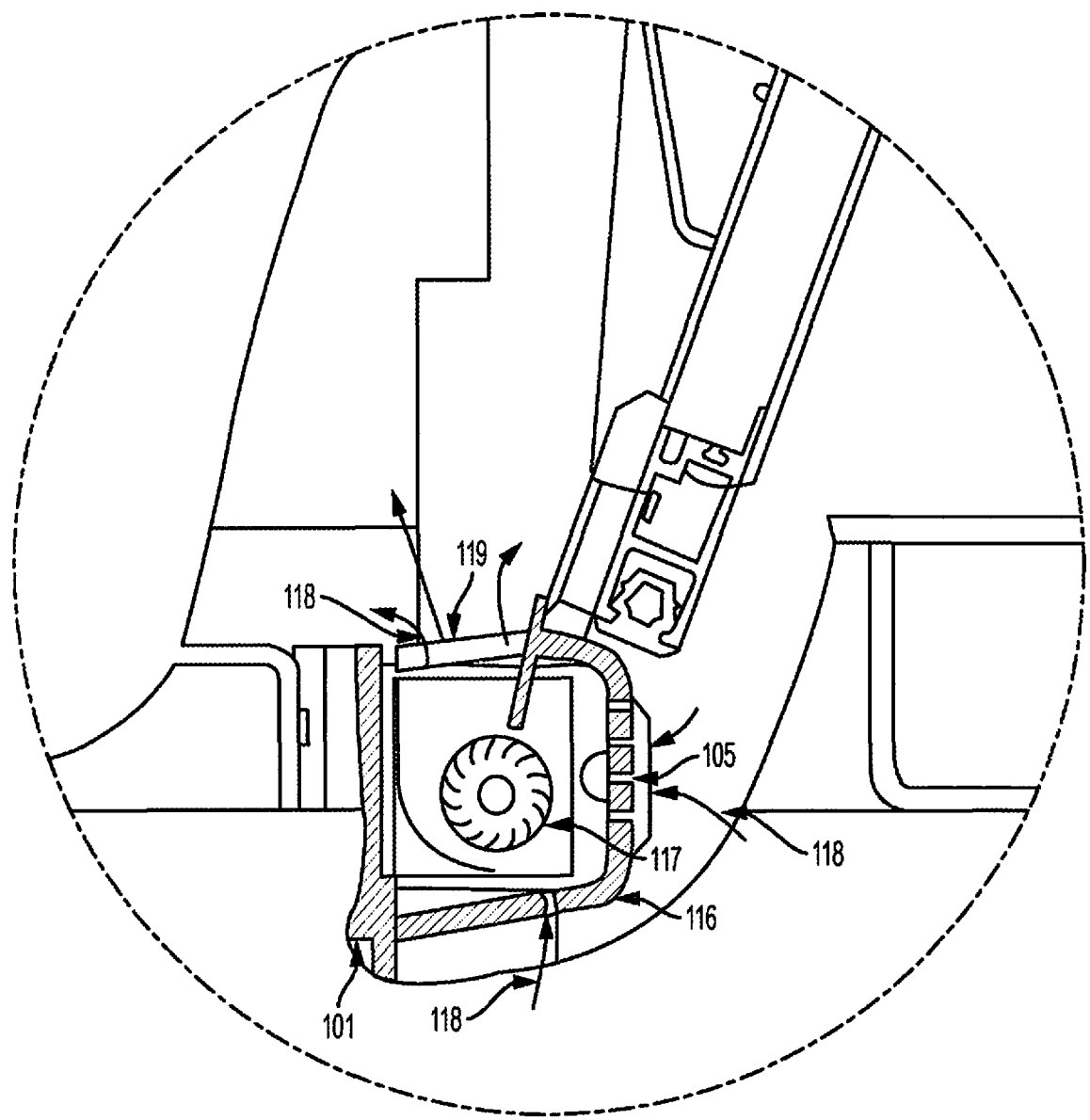
FIG. 25 is an enlarged view of area XXV shown in FIG. 24.
Figure 26:
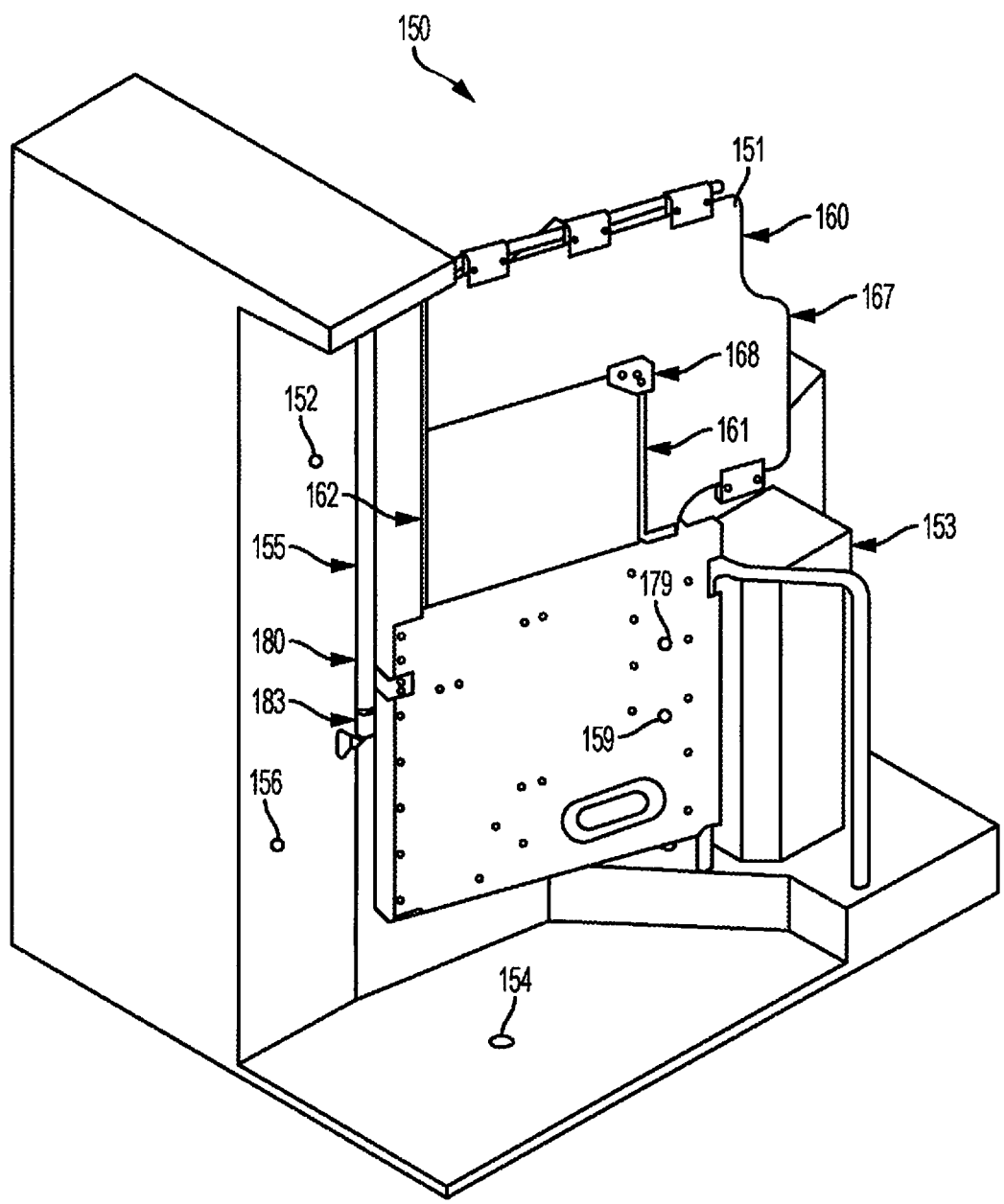
FIG. 26 is an exterior perspective view of a protective enclosure having a barrier door according to another example of the present disclosure.

With reference to FIGS. 23-25, according to an alternative example of the present disclosure, the protective enclosure may alternatively or additionally incorporate a configuration for creating a ventilation air flow 118 about the hinge structure 105 of the barrier door. As shown, the barrier door is coupled to the rear screen 101 via the hinge structure. An extension 116 located substantially at or near the location of the hinge structure along the rear screen defines a plenum with an electric blower 117 positioned therein. The plenum of the extension and the electric blower may create the flow of air 118 into or out of the protective enclosure. A gap 119 may be formed between the rear screen and the barrier door to allow for the air flow to enter or exit the protective enclosure. The extension is generally configured to provide a complete barrier between the rear screen and the barrier door for both security reasons and to reduce an amount of air from escaping from the extension.

The electric blower 117 positioned within the extension 116 is shown as a tangential blower having a vertical axis. However, it is to be appreciated that the electric blower may be of any configuration. For instance, the electric blower could be a radial blower or any other suitable blower as needed for a particular configuration of the protective enclosure.

According to the alternative example of FIGS. 23-25, electrical wiring does not need to be run into the barrier door 107 in order to operate a ventilation system. Accordingly, a ventilation system according to this example may reduce the overall complexity of installation and maintenance.

According to another example of the disclosure, the electric blowers 111, 117 of any of the previously described examples may incorporate a heating and/or cooling element, thereby providing additional and improved localized climate control for the operator. Additionally or alternatively, according to another example, the electric blowers 111, 117 may incorporate speed and/or directional controls to allow for more adjustability in the environmental conditions within the enclosure.

In accordance with another example of the disclosure, any of the ventilation systems described herein may be configured to incorporate a thermostat therewith, allowing for the control of an on/off state, speed, and/or direction of the electric blowers 111, 117 to be automated. Optionally, the thermostat may be used to regulate the state of those features, such as the state of the heating and/or cooling elements, as well.

In accordance with another example, any of the ventilation systems described above could be constructed to incorporate one or more sensors configured to control operation of the electric blowers 111, 117. As one example, the sensors may detect or otherwise sense when the barrier door 107 is opened, and may stop or change operation of the electric blowers when the barrier door is open. Such a configuration may prevent unnecessary operation of the electric blowers while the operator is either not present in the protective enclosure 100 or does not require closure of the barrier door.

With reference to FIGS. 26-35, a protective enclosure 150 for a vehicle is shown in accordance with another example of the present disclosure. As shown, the protective enclosure 150 is located in the left front portion of the vehicle (e.g., a bus). It is to be appreciated that other locations for the protective enclosure are possible. A rear screen 152 is located directly behind the position within the protective enclosure to provide a separation between the rear of the position and another section of the vehicle (e.g., a passenger area, a storage area, or the like). The rear screen may be completely non-transparent or it may incorporate one or more windows or other transparent features therein. Adjacent to the protective enclosure may be a fare box 153, which enables passengers to pay fares while entering or exiting the vehicle.

Coupled to the rear screen is a barrier door 151. The barrier door is configured to rotate about a hinge structure 155 which runs vertically between respective mounting points along an edge of the rear screen. In one or more embodiments, the barrier door may be placed at a sufficient distance from the entrance to the vehicle to allow for unhindered access to passengers, including those in wheelchairs. The barrier door may also be positioned above a floor level 154 of the vehicle so as to provide adequate clearance. However, it is to be appreciated that the barrier door may reach entirely to the floor level. Additionally, while the barrier door provides adequate clearance for passengers, it is also positioned at an adequate distance away from the position so as to comfortably provide the driver with access to all of the controls in the protective enclosure 150.

As noted above, the barrier door 151 is configured to be coupled to an edge of the rear screen 152 via the hinge structure 155. The barrier door 151 may be configured so as to rotate through the aisle (i.e., outward toward the passenger entrance) to be stowed against a structure 156 located on the rear screen. However, alternative methods of coupling and/or stowing the barrier door, such as a sliding mechanism or forward swinging door, are also possible.

Figure 27:
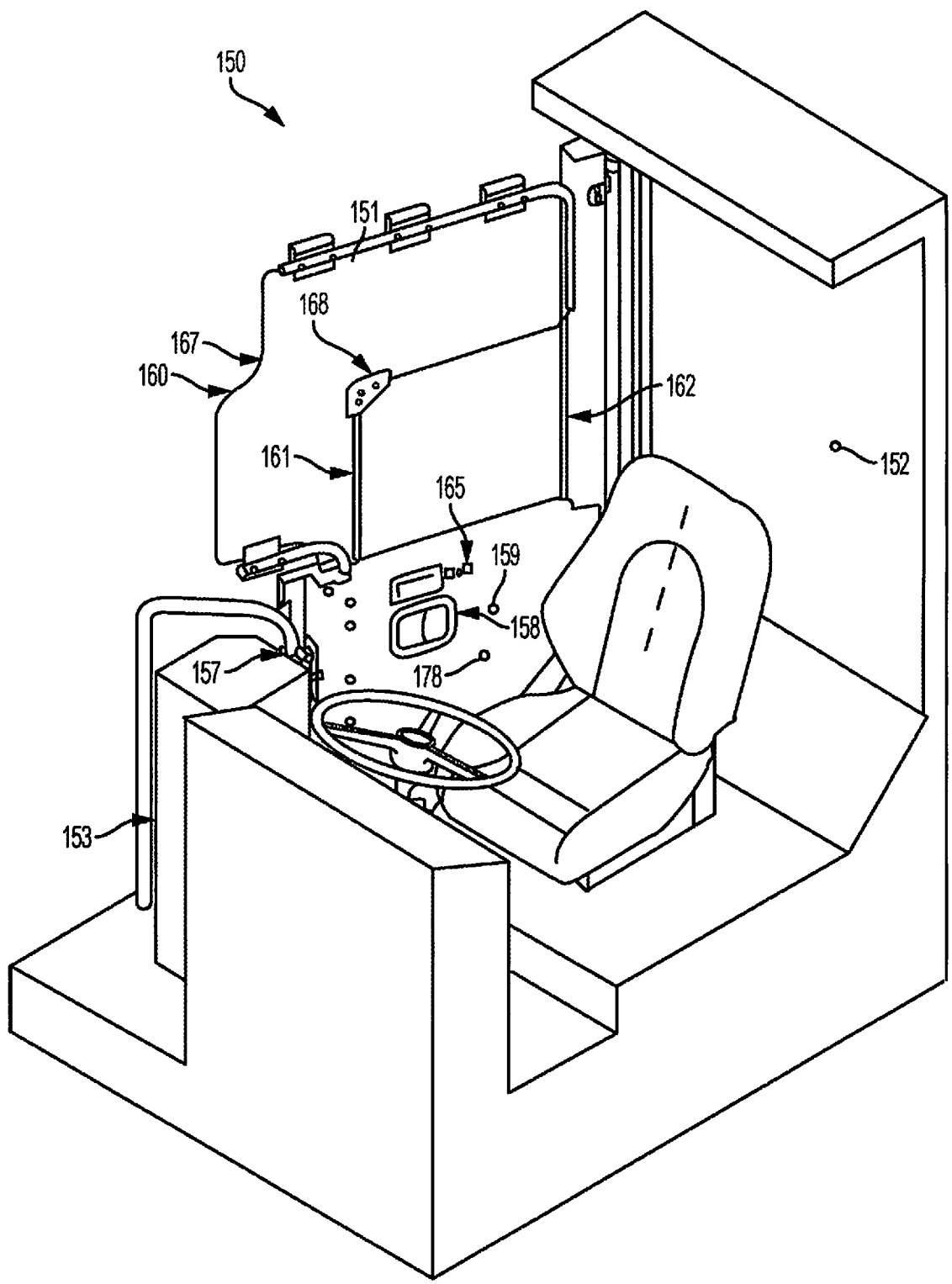
FIG. 27 is an interior perspective view of the protective enclosure of FIG. 26.
Figure 28:
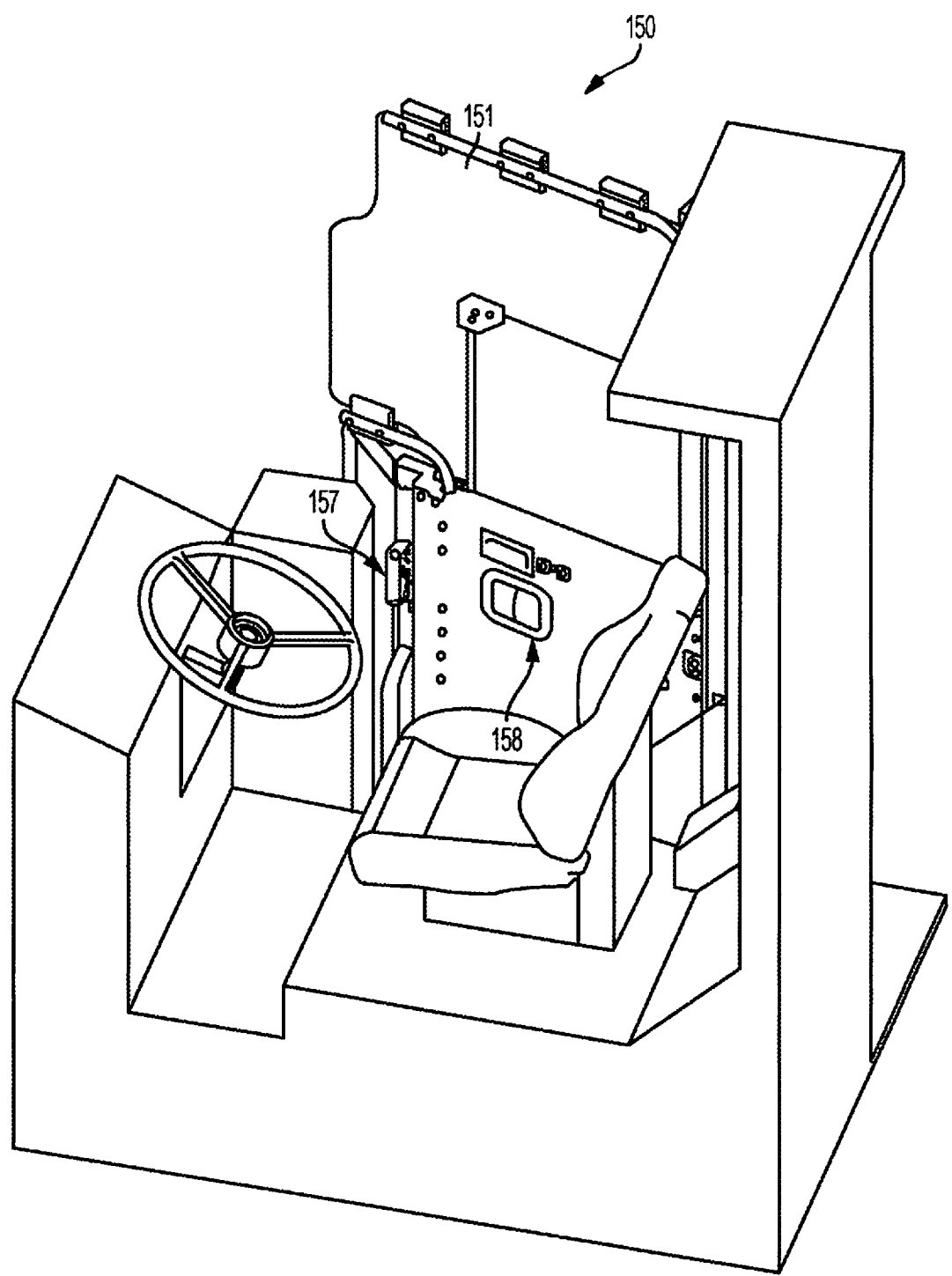
FIG. 28 is another interior perspective view of the protective enclosure of FIG. 26.

The barrier door also includes a latch 157 at a forward end thereof. The latch is operable to secure the barrier door in a closed position. As shown in FIGS. 27 and 28, a latch release control 158, such as a release lever, is positioned on the interior side of the barrier door so as to be easily accessible by the driver to exit the protective enclosure. The latch release control may be positioned at an area of the barrier door that can be accessed from the outside in the event of an emergency, through an opening in an upper section 160 of the barrier door. It is to be appreciated that alternative latch and latch release mechanisms may be used, such as positioning the latch at the rearward end of the barrier door and the hinge structure 155 at the forward end, or any alternative configuration.

Figure 29:
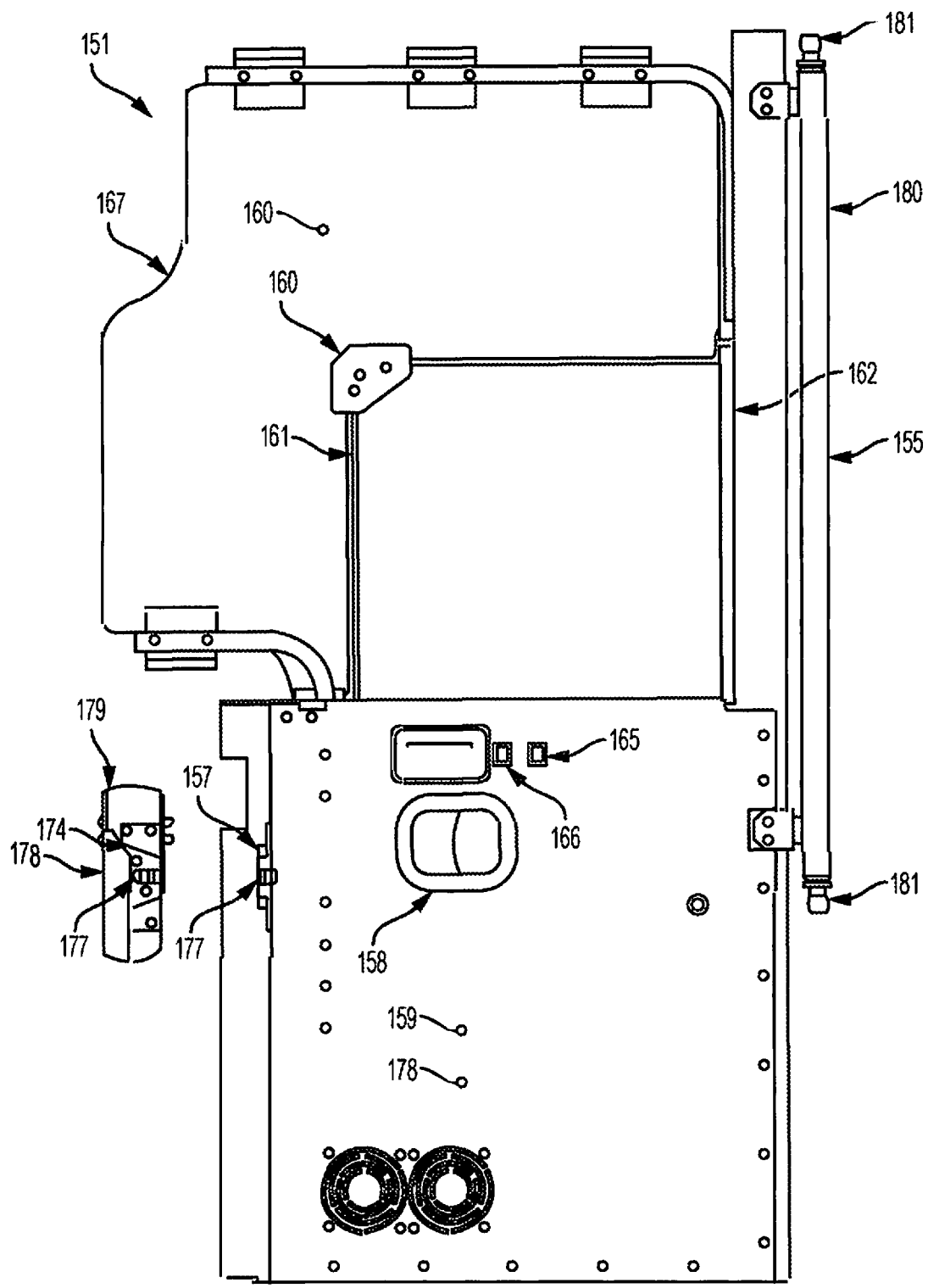
FIG. 29 is an interior side view of the barrier door of the protective enclosure of FIG. 26.
Figure 30:
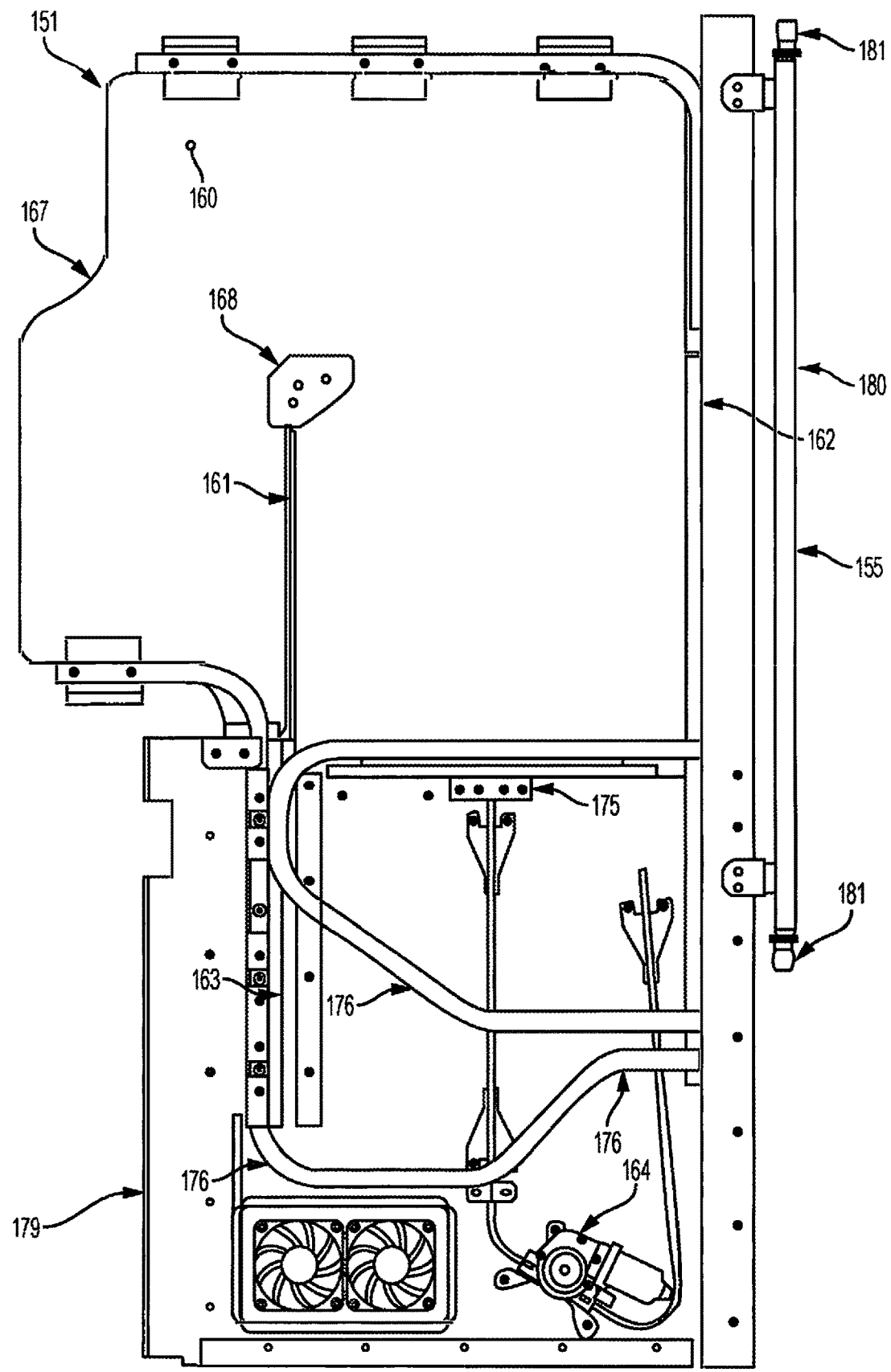
FIG. 30 is an interior side view of the barrier door of FIG. 29 with an inner panel removed.

With reference to FIGS. 26-30, the barrier door includes a lower section 159 and an upper section 160. The lower section may be made from a rigid, non-transparent material such as a metallic material or a non-metallic material, and may incorporate one or more windows or transparent sections. The upper section is formed from a light transmissive material. In particular, the upper section may be made from a transparent material or materials, such as laminated glass or polycarbonate. In one or more embodiments, the upper section may include an inner movable panel or window 161 disposed within an outer stationary panel or window 167. The inner movable window 161 is mounted for vertical movement between a lowered position in which the inner movable window is at least partially withdrawn into the lower section to form an opening in the upper section, and a raised position in which the inner movable window closes the opening. The inner movable window is mounted for vertical movement in a forward channel structure 163 and a rearward channel structure 162 (or any other suitable vertical guide structure), and is supported from below by a lift device 164. According to one example, the lift device may be an electromechanical lift device, such as a window regulator. The lift device operates to raise and lower the inner movable window within the channel structures 162, 163. As shown in FIG. 30, the lift device may be a cable-driven electromechanical lift device. Alternatively, the lift device may have any alternative configuration, such as a scissor lift, a parallel pulley system, or the like.

The electromechanical lift device is controlled by a window regulator controller 165. Incorporated into the window regulator controller may be a system that monitors the current of the motor of the electromechanical lift device and identifies increases and/or decreases in current draw. An increase in current draw may indicate that the inner movable window 161 is being restricted from being closed (or opened), perhaps through collision with an object, such as a person's hand. Accordingly, when an increase in current draw over a predetermined amount is determined, window regulator controller 165 may respond by slowing or halting the upward motion of the inner movable window, thereby acting to prevent pinching of a hand or other object between the inner movable window and another portion of the upper section 160. In such an instance, the window regulator controller may be configured to hold inner movable window 161 in place, retract the inner movable window slightly downward to release any trapped objects (e.g., decrease the current draw), automatically fully retract the inner movable window, or the like. The window regulator controller may also be configured to impart any combination and/or variation of the above reactions based on an indication of increased current draw. The same system that monitors the current draw may also be utilized to stop motion of the inner movable window in a fully-up or fully-down position. Alternatively, limit switches or position sensors may be incorporated to set the fully-up or fully-down position of the inner movable window. A light curtain or object detection sensor, such as an ultrasonic sensor, could also be used to detect an object impeding the inner movable window so as to stop motion of the inner movable window. Furthermore, various commercially-available contact-based or resistive force anti-pinch sensors could be incorporated into the barrier door 151 for additional protection.

With reference to FIG. 29, the interior side of the barrier door 151 includes an up/down control 166, which enables the driver or operator to control the upward and downward movement of the inner movable window 161. The window regulator controller 165 may be configured such that a momentary press of the up/down control may trigger the window to automatically travel to the fully-up or fully-down position, respectively. The up/down control may include two buttons, a toggle switch, a lever, or any other user interface. According to another example of the present disclosure, the up/down control may also incorporate a control for operating the blowers 111 of a ventilation system 69, 120 as discussed above with reference to the examples of FIGS. 1-25.

Figure 35:
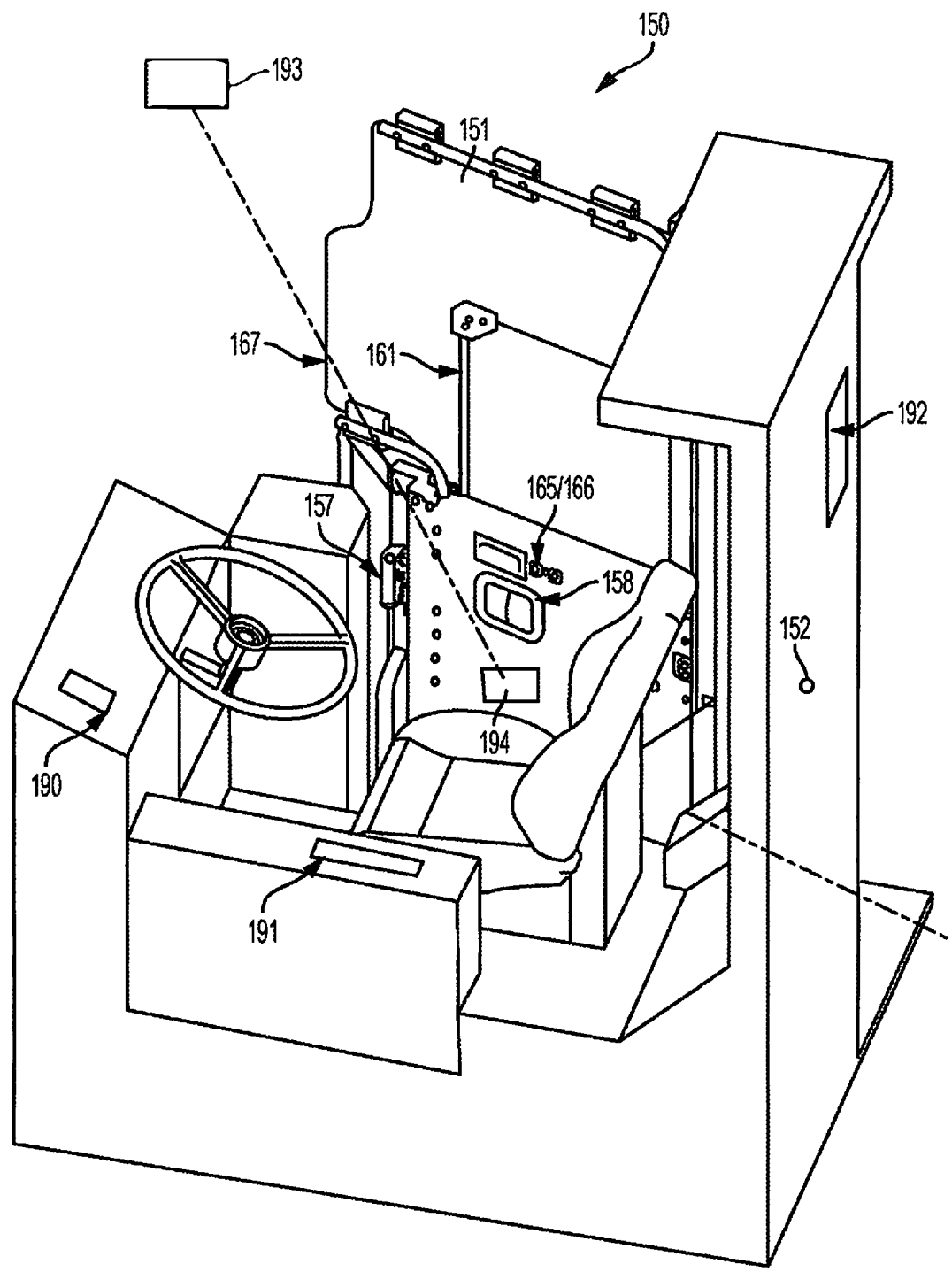
FIG. 35 is an interior perspective view of the protective enclosure of FIG. 26 according to an alternative example of the present disclosure.

With reference to FIG. 35, according to another example of the present disclosure, the protective enclosure 150 may incorporate additional or alternative controls 190, 191, 192 positioned away from the barrier door 151 to operate the electromechanical lift device 164 to move the inner movable window 161 between the raised and lowered positions. For instance, a set of controls 190 may be incorporated in the dashboard or instrument panel in front of the operator position. Another set of controls 191 may be incorporated into a side panel of the vehicle to the left of the position. The controls may also be located in alternate locations for different configurations of the vehicle, such as if the vehicle is designed to drive on the left side of the road, in which case the protective enclosure 150 and the controls would have a reverse configuration.

Additionally or alternatively, a set of controls 192 may be placed on the exterior of the protective enclosure, such as on the rear screen 152. Such a set of controls 192 would allow for access to the protective enclosure 150 from the outside, such as in the event of an emergency. The exterior controls 192 may be secured behind a locked cover or similar apparatus or may require a key to enable actuation to prevent tampering and unauthorized use of the controls 192.

The controls could be incorporated in a cluster with other controls such as the controller for the exterior doors of the vehicle. Multiple control locations could also be incorporated to provide an alternate location to access the controls for convenience and safety, such as to unlatch the barrier door 151 in an emergency. The controls could also incorporate a security feature, such as a locking device, to prevent unauthorized use. The controls could also incorporate a covering device, such as a "molly-guard", to prevent accidental activation. Depending on the location of the control, additional safety features may be incorporated, such as an anti-pinch function to prevent injury in the event that a powered window is closed from a position where visibility is temporarily obstructed.

Optionally, the window controls 165, 166, 190, 191 may be located inside the protective enclosure 150 and may be designed to override the external controls 192. As an additional measure, such as to prevent nuisance activation, the controls in the protective enclosure 150 may be set such that a single press in the "window up" direction, which would typically be activated to automatically lift the window to the fully raised and closed position, will override the external controls 192 for a configurable duration of time.

According to another example of the present disclosure, the barrier door 151 may include a controller device 194 configured to activate the electromechanical lift device 164 to raise or lower the inner movable window 161. The controller device 194 may be in communication with a remote telecommunications device 193 that is programmed to transmit and/or receive commands with the controller device 194 to operate the electromechanical lift device 164.

According to the example, a telecommunications device 193, such as a computer having one or more processors, may include a window control that may be available to a person at a remote location, such as a security officer's location at the bus depot or station. This availability may be combined with a mechanism to alert the security officer of an emergency situation, such as an intercom, emergency alarm button, or remote video feed.

Optionally, the telecommunications device 193 may be a phone, and a phone number may be established that could be called from any phone. An automated system may be able to take the bus number and a security code available only to authorized users, such as emergency first responders, that would then allow them to access an automated menu (e.g., press "1" for auto-down, press "2" for unlatch) that would allow them to issue commands to the controller device 194 to activate an auto-down window function or unlatch a powered latch. The security codes could be replaced in the event of a data breach or as a regular rotation to prevent unauthorized access.

According to another example, the functions described above may be implemented in an application for a smart phone device. The application could be set up to only be loaded onto authorized devices. Additionally, security codes may also be used as discussed above to ensure that only authorized users have access. The smart phone application could allow more nuanced controls, such as a virtual window control. Such controls could also be used by the driver as the primary controls for the electromechanical lift device 164 or other devices incorporated in the barrier door 151.

According to another example, the electromechanical lift device 164 may incorporate a power storage device that could be used in the event of a power failure to automatically lower the inner movable window 161 to a position where the latch release control 158 is accessible. Optionally, the power storage device may set the electromechanical lift device 164 to a state where the inner movable window 161 can be pushed down to a position allowing access using a positive but reasonable force. In one or more embodiments, restoration of power may not cause the inner movable window 161 to be lifted back to the raised position unless controlled to do so. Restoration of power may re-engage the electromechanical lift device 164 to prevent back-driving of the inner movable window 161 while power is present. This would also allow access to the protective enclosure 150 while the vehicle has been shut down.

According to another example, the use of the external controls 192 may trigger an emergency alert condition on the vehicle that may sound an internal alarm, alert a security officer at a central location such as bus depot or station, and/or alert emergency responders. Warnings and/or physical guards would be placed over the external controls 192 to prevent inadvertent activation. A secure bypass mechanism could be included to allow an authorized user to activate the external controls 192 without setting off the emergency alerts, such as if the driver was accidentally locked out of the protective enclosure 150.

In one or more embodiments, one or more of the electromechanical lift device 164, the window regulator controller 165, the up/down control 166, the sets of controls 190, 191, 192 (e.g., located inside and/or outside the barrier door 151), or the controller device 194 may be configured to communicate with an external telecommunications device 193, according to the examples discussed above with reference to FIGS. 26-35, and/or may also be incorporated into the protective enclosure 10 and the barrier door 15 discussed above with reference to FIGS. 1-17.

With reference to FIGS. 29 and 30, the upper section 160 of the barrier door 151 may include the stationary outer window 167, which is located above and forward of the inner movable window 161. The stationary outer window 167 provides additional coverage and protection above and outside of the inner movable window 161. The inner movable window 161 must be able to travel into the lower section 159 while the inner movable window 161 is in the down position. Accordingly, the inner movable window cannot extend beyond the dimensions of the lower section 159 and can extend only to a limited height above the lower section 159. The stationary outer window 167 may provide coverage areas forward and rearward of the lower section 159 where the inner movable window 161 is unable to reach. The stationary outer window may be positioned to be coplanar with the inner movable window, may be separated from the inner movable window by a gap between the inner movable window (while at least partially closed) and the adjacent portions of the outer stationary window. In one or more embodiments, the outer stationary window 167 may include cut-out areas in strategic locations to provide the driver with an unobstructed view of the rearview and side-view mirrors. The outer stationary window may be formed from the same material as the inner movable window or may be formed from a different light transmissive or transparent material.

As discussed above, the inner movable window 161 may be supported by the rearward channel structure 162 on the rearward side of the barrier door and by the forward channel structure 163 on the forward side of the barrier door. The forward channel structure may be disposed only in the lower section 159 of the barrier door and may support the inner movable window at regions below the upper jamb of the barrier door, thereby reducing the effectiveness of the support on the forward side as the inner movable window travels upward to the raised position and/or downwards to the lowered position. Optionally, the outer stationary window 167 may also include an anti-rattle pocket 168.

Figure 31:
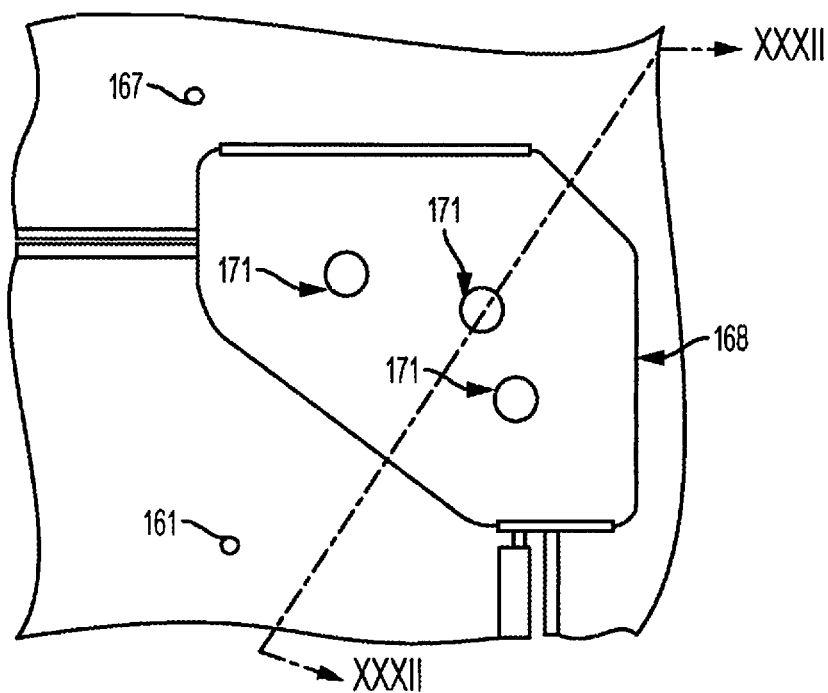
FIG. 31 is an enlarged view of a portion of an upper section of the barrier door of FIG. 29.
Figure 32:
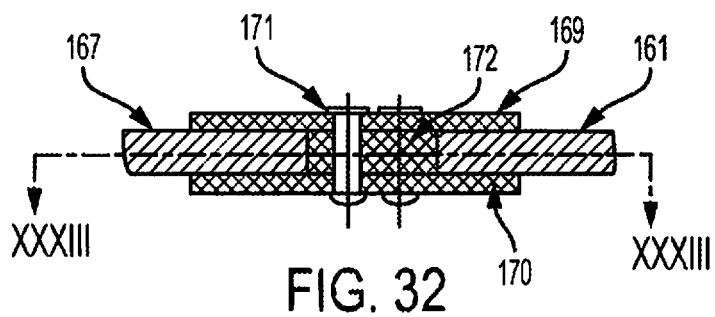
FIG. 32 is an enlarged cross-sectional view taken along lines XXXII-XXXII shown in FIG. 31.
Figure 33:
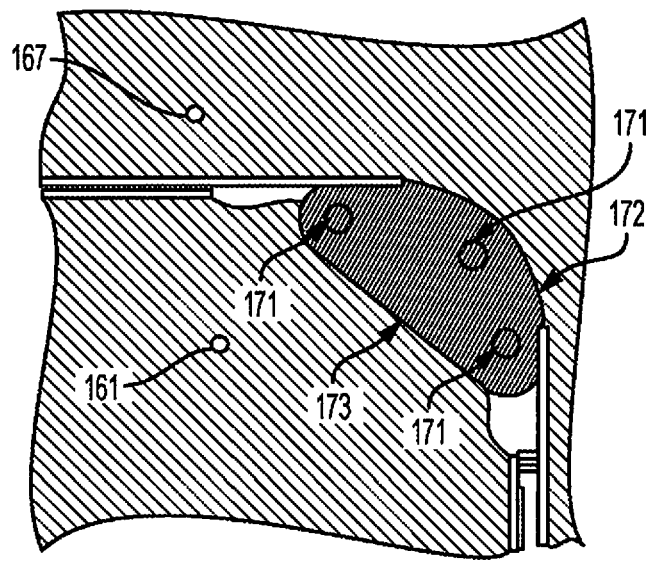
FIG. 33 is an enlarged cross-sectional view taken along lines XXXIII-XXXIII shown in FIG. 32.

As shown in FIGS. 31-33, according to one example, the anti-rattle pocket 168 may be located at one corner of the opening in the upper section 160 that accommodates the inner movable window 161. The anti-rattle pocket 168 is constructed from two plates 169, 170, each being formed from a light transmissive or transparent material to allow visibility therethrough. The plates 169, 170 are connected to each other and the stationary outer window 167 via barrel bolts, threaded inserts, or similar fasteners 171. Portions of the plates 169, 170 may overhang into the region in which the inner movable window 161 passes while moving toward the fully-up position. In this manner, the plates 169, 170 may provide support on each side of the inner movable window 161 as it reaches the raised position. The edges of the plates 169, 170 may incorporate lead-in chamfers to allow for easier entry of the inner movable window 161 as it travels to the raised position. Additionally, the anti-rattle pocket 168 may be constructed to be slightly narrower than the thickness of the inner movable window 161 so as to provide a slight positive retention force on the inner movable window 161, which may act to reduce vibration caused by the interaction between the inner movable window 161 and the plates 169, 170.

According to one or more embodiments, the upper section 160 may include a pocket extending along the length of the path of the inner movable window 161, such as extending the forward channel structure 163 upward into the upper section 160. In this example, the extended channel structure may include an H-shaped section of clear extruded channel in order to maintain the complete transparency of the upper section 160.

According to another example, the plates 169, 170 may be secured via a clear adhesive instead of by the fasteners 171.

In one or more embodiments, the material forming the upper section 160 may not be suitable for having throughholes formed therein, such as a laminated tempered safety glass, a plug 172 may be formed from an elastomer material for further vibration dampening. The plug 172 may be formed to have a slightly smaller thickness than the material of the upper section 160 in order to force the plates 169, 170 or support panels to squeeze against the surfaces of the upper section 160, thereby securing the plug 172. Furthermore, the base of anti-rattle pocket 168 may comprise an angled surface 173 relative to the inner movable window 161. This angled surface 173 may provide a jamming force to positively secure the inner movable window 161 in place in the fully-up position, thereby preventing the rattle noises commonly caused by vibration of the vehicle.

With reference to FIGS. 29 and 30, a latch mechanism 177 for the barrier door 151 may incorporate a dovetail 174. Due to the increased weight of barrier door 151 having both a lower section 159 and an upper section 160, there may be a need to provide added support at the latching location to prevent door sag, as well as to prevent rattle. The dovetail 174 may act as a wedge to vertically support the barrier door 151 at the forward side. The dovetail and/or latch mechanism 177 may further incorporate spring-loaded features that can be used to provide back pressure on latch 157 on the barrier door, thereby helping to prevent rattle.

As shown in FIGS. 29 and 30, the channel structures 162, 163, electromechanical lift device 164, and support hardware 175 are mounted on an internal framework 176 within the lower section 159 of barrier door 151. The framework and channel structures may be sized to have a limited number of configurations suitable for most common bus (or other transit vehicle) structures. Optionally, the latch mechanism 177 may be mounted separately, such as on sheet metal panels that form an inner panel 178 and an outer panel 179 of barrier door.

In addition to the changes in the panels 178, 179 and the outer stationary window 167 of the barrier door 151 to accommodate differences in vehicle size, the hinge structure 155, which includes a shaft 180 and pin 181 construction, may also be modified. For example, the length of shaft and/or the pin may be modified to accommodate variable hinge mount heights for different vehicles. Furthermore, the shaft and/or the pin may be incorporated into existing bus stanchions in the event that the stanchion is the preferred mounting point. Accordingly, the overall construction of barrier door may be adaptable to many vehicle models and sizes.

Figure 34:
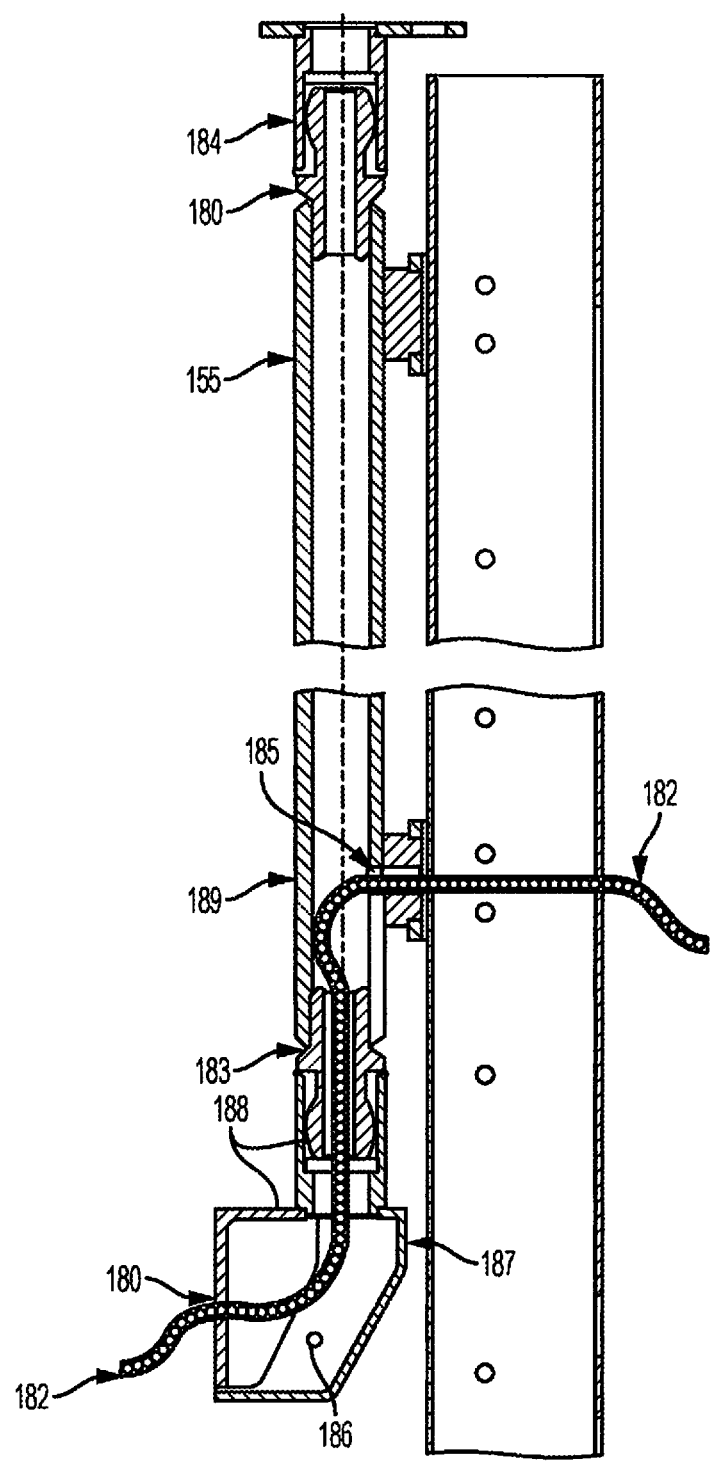
FIG. 34 is a cross-sectional view of a hinge structure of the barrier door of FIG. 29.

With reference to FIG. 34, according to an example of the present disclosure, the hinge structure 155 of the barrier door 151 may be configured to accommodate electrical wiring 182 extending from the structure of the vehicle to the barrier door. As shown, the electrical wiring leads to the electromechanical lift device 164, along with any associated accessories requiring electrical connection within the barrier door. The electrical wiring is routed through hinge structure 155 so as to prevent tampering from the outside of the protective enclosure 150. A hinge shaft 189 is constructed to be hollow, with a hollow pin 183 at each end inserted into an upper hinge receptacle 184 and a lower hinge receptacle 188, respectively, each having an integral friction bearing which may be comprised of vibration attenuating bearing material. The connection from the hinge shaft to the barrier door may include a pass-through hole 185, which may allow electrical cabling to be routed from the door into the hinge shaft. The base of the lower hinge receptacle is constructed in such a way as to have a hollow area 186 in a lower region, with a cover 187. With this construction, cabling is able to be routed between the base of the lower hinge receptacle and the pass-through hole in the hinge mounting surface. While shown in the lower hinge receptacle 188, it is to be understood that the pass-through of electrical cabling could also be accomplished via the upper hinge receptacle 184.

In or more embodiments of the subject matter described herein, a barrier door for a protective enclosure includes a lower section and an upper section operably coupled with the lower section, and a ventilation system disposed within the lower section. The ventilation system includes one or more blowers and a plenum. The ventilation system is configured to direct air one or more of into or out of the protective enclosure.

Optionally, the one or more blowers may include at least two blowers.

Optionally, the at least two blowers may direct air in the same direction.

Optionally, one of the at least two blowers is configured to direct air into the protective enclosure, and the other of the at least two blowers is configured to direct air out of the protective enclosure.

Optionally, one of the at least two blowers is configured to operate at a first operating speed, and the other of the at least two blowers is configured to operate at a second operating speed.

Optionally, the barrier door may include a controller operably coupled with the ventilation system. The controller may control one or more operational settings of the ventilation system.

Optionally, the controller may automatically control the one or more operational settings of the ventilation system based on one or more predetermined thresholds.

Optionally, the barrier door may include one or more sensors. The controller may control the one or more operational settings of the ventilation system based on data obtained by the one or more sensors.

Optionally, the protective enclosure may be disposed onboard a vehicle system. An operator of the vehicle system may control one or more operational settings of the ventilation system.

Optionally, the ventilation system may direct air in a direction from the lower section toward the upper section.

Optionally, the barrier door may include one or more channels fluidly coupled with the one or more blowers. The one or more channels may direct the air in one or more directions within one or more of the lower section or the upper section.

In one or more embodiments of the subject matter described herein, a door system for an enclosure includes a lower section, an upper section operably coupled with the lower section, and a ventilation system disposed within the lower section. The ventilation system includes at least two blowers and a plenum. The ventilation system may direct air one or more of into or out of the enclosure.

Optionally, the at least two blowers may direct air in the same direction.

Optionally, one of the at least two blowers may direct air into the enclosure, and another of the at least two blowers may direct air out of the enclosure.

Optionally, one of the at least two blowers may operate at a first operating speed, and another of the at least two blowers may operate at a second operating speed.

Optionally, the door system may include a controller operably coupled with the ventilation system. The controller may control one or more operational settings of the ventilation system.

Optionally, the door system may include one or more sensors. The controller may control the one or more operational settings of the ventilation system based on data obtained by the one or more sensors.

Optionally, the enclosure may be disposed onboard a vehicle system. An operator of the vehicle system may control one or more operational settings of the ventilation system.

Optionally, the ventilation system may direct air in a direction from the lower section toward the upper section.

In one or more embodiments of the subject matter described herein, a barrier door system includes a ventilation system disposed within a section of a door. The ventilation system includes a blower and a plenum. The barrier door system includes a controller comprising one or more processors operably coupled with the ventilation system. The controller is configured to control one or more operational settings of the ventilation system. One or more sensors may be operably coupled with the controller. The controller is configured to control the one or more operational settings of the ventilation system based on data obtained by the one or more sensors.

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A barrier door for a protective enclosure, the barrier door comprising:
   a lower section;
   an upper section operably coupled with the lower section; and
   a ventilation system disposed within the lower section, the ventilation system comprising one or more blowers and a plenum,
   wherein the ventilation system is configured to direct air one or more of into or out of the protective enclosure.

2. The barrier door of claim 1, wherein the one or more blowers comprises at least two blowers.

3. The barrier door of claim 2, wherein the at least two blowers are configured to direct air in the same direction.

4. The barrier door of claim 2, wherein one of the at least two blowers is configured to direct a portion of the air into the protective enclosure and another of the at least two blowers is configured to direct a portion of the air out of the protective enclosure.

5. The barrier door of claim 2, wherein one of the at least two blowers is configured to operate at a first operating speed, and another of the at least two blowers is configured to operate at a second operating speed.

6. The barrier door of claim 1, further comprising a controller operably coupled with the ventilation system, wherein the controller is configured to control one or more operational settings of the ventilation system.

7. The barrier door of claim 6, wherein the controller is configured to automatically control the one or more operational settings of the ventilation system based on one or more predetermined thresholds.

8. The barrier door of claim 6, further comprising one or more sensors, wherein the controller is configured to control the one or more operational settings of the ventilation system based on data obtained by the one or more sensors.

9. The barrier door of claim 1, wherein the protective enclosure is disposed onboard a vehicle system, wherein an operator of the vehicle system is configured to control one or more operational settings of the ventilation system.

10. The barrier door of claim 1, wherein the ventilation system is configured to direct at least a portion of air through the plenum in the lower section and upward through the barrier door and along an interior side of the upper section that includes a transparent section.

11. The barrier door of claim 1, wherein the barrier door is coupled with a screen via a hinge structure, and further comprising an extension located at the hinge structure along the screen, the extension defining another plenum for the flow of air into or out of the protective enclosure.

12. The door system of claim 1, wherein the ventilation system is configured to direct a portion of the air in a direction from the lower section toward the upper section.

13. A door system for an enclosure, the door system comprising:

a lower section;

an upper section operably coupled with the lower section; and a ventilation system disposed within the lower section, the ventilation system comprising at least two blowers and a plenum, wherein the ventilation system is configured to direct air one or more of into or out of the enclosure.

14. The door system of claim 13, wherein the at least two blowers are configured to direct air in the same direction.

15. The door system of claim 13, wherein one of the at least two blowers is configured to direct a portion of the air into the enclosure and another of the at least two blowers is configured to direct a portion of the air out of the enclosure.

16. The door system of claim 13, wherein one of the at least two blowers is configured to operate at a first operating speed, and another of the at least two blowers is configured to operate at a second operating speed.

17. The door system of claim 13, further comprising a controller operably coupled with the ventilation system, wherein the controller is configured to control one or more operational settings of the ventilation system.

18. The door system of claim 17, further comprising one or more sensors, wherein the controller is configured to control the one or more operational settings of the ventilation system based on data obtained by the one or more sensors.

19. The door system of claim 13, wherein the enclosure is disposed onboard a vehicle system, wherein an operator of the vehicle system is configured to control one or more operational settings of the ventilation system.

20. A barrier door system comprising:

a ventilation system disposed within a section of a door, the ventilation system comprising a blower and a plenum;

a controller comprising one or more processors operably coupled with the ventilation system, the controller being configured to control one or more operational settings of the ventilation system; and one or more sensors operably coupled with the controller, wherein the controller is configured to control the one or more operational settings of the ventilation system based on data obtained by the one or more sensors.

* * * * *